United States Patent
Paudel et al.

(10) Patent No.: US 10,837,833 B1
(45) Date of Patent: Nov. 17, 2020

(54) SPECKLE ENHANCED SPATIAL-DOMAIN SPECTROMETER

(71) Applicant: The Aerospace Corporation, El Segundo, CA (US)

(72) Inventors: Uttam Paudel, El Segundo, CA (US); Todd S. Rose, El Segundo, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 16/523,869

(22) Filed: Jul. 26, 2019

(51) Int. Cl.
*G01J 3/45* (2006.01)

(52) U.S. Cl.
CPC ........... *G01J 3/45* (2013.01); *G01J 2003/451* (2013.01)

(58) Field of Classification Search
CPC .......... G01J 3/45; G01J 3/0205; G01J 3/0256; G01J 2003/451; G01B 9/02027
See application file for complete search history.

(56) References Cited

U.S. PATENT DOCUMENTS

| | | | | |
|---|---|---|---|---|
| 9,618,821 B2* | 4/2017 | Jewart | ................... | G02B 6/2813 |
| 2010/0110443 A1* | 5/2010 | Cheben | ................... | G01J 3/4532 |
| | | | | 356/454 |
| 2014/0092385 A1* | 4/2014 | Nitkowski | ............ | G01J 3/0218 |
| | | | | 356/326 |
| 2016/0282184 A1* | 9/2016 | Khalil | ................... | G01J 3/0256 |
| 2017/0138721 A1* | 5/2017 | Podoleanu | ......... | G01B 9/02027 |
| 2017/0227399 A1* | 8/2017 | Hu | ........................ | G01J 3/4531 |

OTHER PUBLICATIONS

Bermello et al., "Temperature dependence mitigation in stationary fourier-transform on-chip spectrometers," Optics Letters vol. 42, No. 11, 2239 (2017).
Cheben et al., "Broad-band polarization independent nanophotonic coupler for silicon waveguides with ultra-high efficiency," Optics Express vol. 23, No. 17, 22553 (2015).
Cui et al., "Photonic sensing of the atmosphere by absorption spectroscopy," Journal of Quantitative Spectroscopy and Radiative Transfer 113, 1300-1316 (2012).
Florjanczyk et al., "Multiaperture planar waveguide spectrometer formed by arrayed mach-zehnder interferometers," Optics Express vol. 15, No. 26, 18176 (2007).

(Continued)

*Primary Examiner* — Jonathan M Hansen
(74) *Attorney, Agent, or Firm* — Knobbe Martens Olson & Bear

(57) ABSTRACT

A speckle-enhanced discrete Fourier transform spectrometer can include waveguides configured to combine speckle spectroscopy techniques with discrete Fourier transform spectroscopy techniques. A discrete Fourier transform spectrometer section can be a compact, passive, chip-scale optical spectrometer. A speckle spectrometer section can include a multi-mode wave guide. An interference region can be in optical communication with both the discrete Fourier transform spectrometer section and the speckle spectrometer section such that light from both sections interfere in the interference region. A detector can be used to detect light from the interference region for detecting spectral content of light over a large bandwidth at a high resolution.

20 Claims, 15 Drawing Sheets

(56) References Cited

OTHER PUBLICATIONS

Haldrup et al., "Singular value decomposition as a tool for background corrections in time-resolved xfel scattering data," Philosophical Transactions of the Royal Society B: Biological Sciences 369, 20130336 (2014).

Hansen, "Regularization tools: A matlab package for analysis and solution of discrete ill-posed problems," Numerical Algorithms 6, 1-35 (1994).

Holstrom et al., "Trace gas raman spectroscopy using functionalized waveguides," Optica vol. 3, No. 8, 891, Optical Society of America (2016).

Hutchinson et al., "Raman spectroscopy on mars: identification of geological and bio- geological signatures in martian analogues using miniaturized raman spectrometers," Philosophical Transactions of the Royal Society A: Mathematical, Physical and Engineering Sciences 372, Feb. 4, 2014 (2014).

Kita et al., "High-performance and scalable on-chip digital fourier transform spectroscopy," Nature Communications 9 (2018).

Kita et al., "On-chip infrared spectroscopic sensing: Redefining the benefits of scaling," IEEE Journal of Selected Topics in Quantum Electronics vol. 23, No. 2, 340349 (2017).

Liew et al., "Broadband multimode fiber spectrometer," Optics Letters, vol. 41, No. 9, 2029 (2016).

Lin et al., "Mid-infrared integrated photonics on silicon: a perspective," Nanophotonics 7, 393-420, De Gruyter (2017).

Piels et al., "Compact silicon multimode waveguide spectrometer with enhanced bandwidth," Scientific Reports 7 (2017).

Paudel, Uttam. "Ultra-high resolution and broadband chip-scale speckle enhanced Fourier-transform spectrometer." Research Gate Conference Paper, Jul. 2019.

Rawson et al., "Frequency dependence of modal noise in multimode optical fibers," Journal of the Optical Society of America, vol. 70, No. 8, 968 (1980).

Redding et al., "All-fiber spectrometer based on speckle pattern reconstruction," Optics Express 21, vol. 21, No. 5, 6584 (2013).

Redding et al., "High-resolution and broadband all-fiber spectrometers," Optica vol. 1, No. 3, 175, Optical Society of America (2014).

Redding et al., "Noise analysis of spectrometers based on speckle pattern reconstruction," Applied Optics vol. 53, No. 3, 410 (2014).

Redding et al., "Using a multimode fiber as a high-resolution, low-loss spectrometer," Optics Letters 37, 3384 (2012).

Subramanian et al., "Silicon and silicon nitride photonic circuits for spectroscopic sensing on-a-chip [invited]," Photonics Research, vol. 3, No. 5 (2015).

Velasco et al., "High-resolution fourier-transform spectrometer chip with microphotonic silicon spiral waveguides," Optics Letters vol. 38, No. 5, 706, Optical Society of America (2013).

Wang et al., "Computational spectroscopy via singular-value decomposition and regularization," Optics Express 22, 21541, Optical Society of America (2014).

\* cited by examiner

US 10,837,833 B1

SPECKLE ENHANCED SPATIAL-DOMAIN SPECTROMETER

BACKGROUND

Field

This disclosure relates to optical spectrometers.

Description of the Related Art

An optical spectrometer is an instrument that measures spectral properties of electromagnetic radiation (e.g., visible or infrared (IR) light). For example, a spectrometer may measure the respective intensities of frequency components of an optical signal.

A variety of metrics can be used to characterize the performance of a spectrometer. One such metric is the spectrometer's bandwidth, which characterizes the range of electromagnetic wavelengths it can measure. Another such metric is the spectrometer's resolution, which characterizes the separation between the closest electromagnetic wavelengths which can be separately resolved by the instrument. The finesse of a spectrometer is a metric which characterizes both bandwidth and resolution, as it is defined as the instrument's bandwidth divided by its resolution. It is often desirable that a spectrometer have a wide bandwidth and a fine resolution, meaning that spectrometers with higher finesse are usually preferred.

Spectrometers can be used in a wide variety of technical fields, including the following: optical spectroscopy (e.g., for absorption or fluorescence measurements, etc.); optical communications (e.g., for active monitoring of multiple optical channels in a dense wavelength division multiplexed link, laser frequency tracking, etc.); remote sensing (e.g., for water vapor sensing, atmospheric monitoring, chemical and biological species sensing using Raman spectroscopy, etc.). With technological advances in these fields, there is a need for spectrometers with improved optical performance, such as in the form of higher finesse.

Many types of spectrometers are complex instruments with a relatively large size, weight and power (SWaP). This places limitations on the applications in which they can be used. Thus, there is also a need for improved spectrometers with lower SWaP, particularly when they can also offer improved optical performance.

SUMMARY

In some embodiments, a spectrometer comprises: a plurality of interferometers configured to produce a first spatially-distributed pattern of light corresponding to one or more spectral characteristics of an input light signal; a multi-mode waveguide configured to produce a second spatially-distributed pattern of light corresponding to the one or more spectral characteristics of the input signal; an interference section in optical communication with both the multi-mode waveguide and the plurality of interferometers such that the second spatially-distributed pattern of light interferes with the first spatially-distributed pattern of light in the interference region; and a detector positioned to detect a plurality of intensity values of light from the interference region.

DETAILED DESCRIPTION

This application describes embodiments of a speckle-enhanced discrete Fourier transform spectrometer in the context of optical spectrometers because they have particular utility in that context. The inventions disclosed herein, however, can also be used in other contexts as well.

The enhanced discrete Fourier transform spectrometers disclosed herein can include time-domain and spatial-domain instruments. The speckle-enhanced discrete Fourier transform spectrometer may be, for example, a compact, passive, chip-scale optical spectrometer. The speckle-enhanced discrete Fourier transform spectrometer can offer increased finesse (i.e., bandwidth/resolution, $\Delta\lambda/\delta\lambda$) by several orders of magnitude in comparison to a discrete Fourier transform spectrometer or a speckle spectrometer. As discussed further herein, this can be accomplished by combining speckle spectroscopy techniques with discrete Fourier transform spectroscopy techniques, which in some embodiments, are combined into a single, integrated device.

Figure 1A:
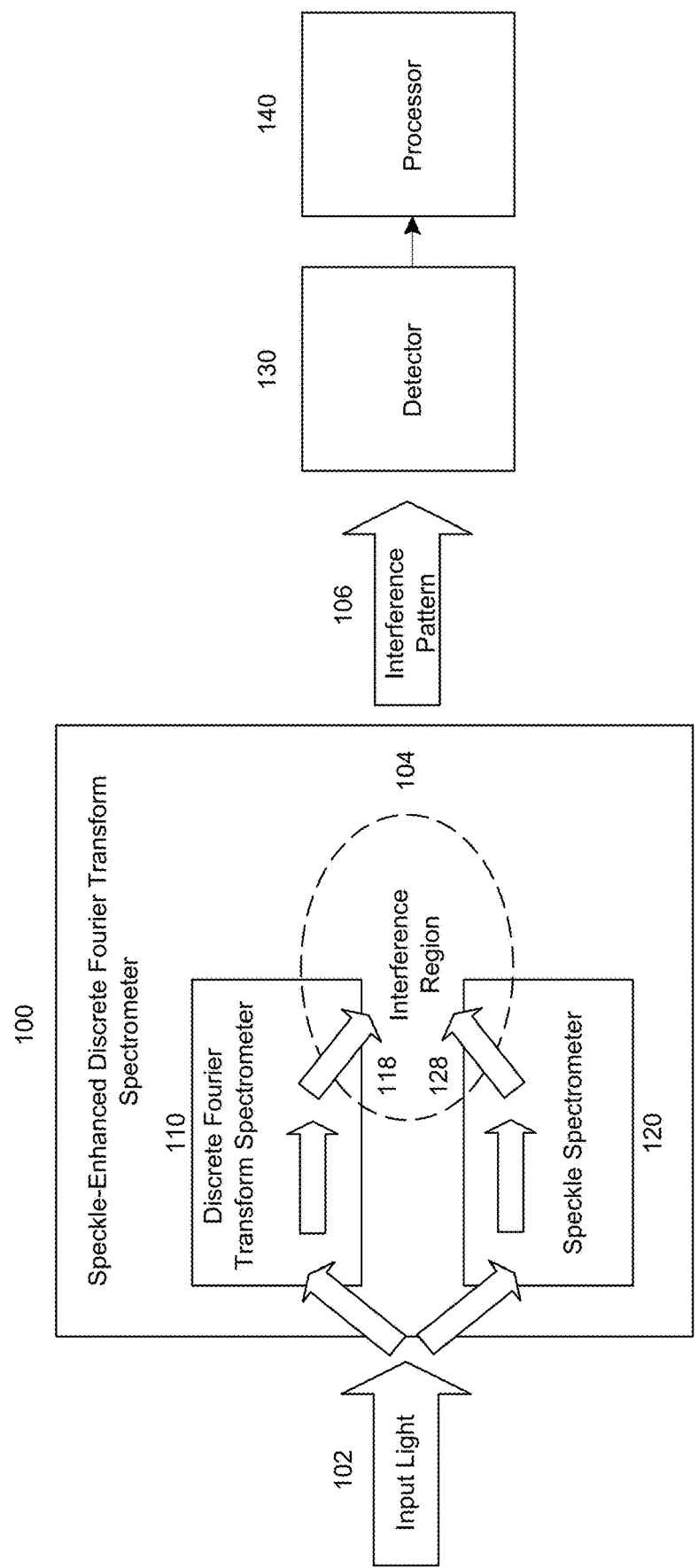
FIG. 1A is a block diagram of an example embodiment of a speckle-enhanced discrete Fourier transform (SDFT) spectrometer.

FIG. 1A is a block diagram of an example embodiment of a speckle-enhanced discrete Fourier transform (SDFT) spectrometer 100. The SDFT spectrometer 100 includes a discrete Fourier transform (DFT) spectrometer section 110 and a speckle spectrometer section 120. The DFT spectrometer section 110 and the speckle spectrometer section 120 both receive input light 102 from a source whose spectrum is to be measured. The input light 102 passes through the DFT spectrometer section 110 and the speckle spectrometer section 120 in parallel.

As discussed further herein, the DFT spectrometer section 110 can include a plurality of spatially-separated interferometers. The intensity of light at the output of each interferometer is a sample of a spatially-distributed intensity pattern which corresponds to the specific spectral content of the input light 102. Meanwhile, as also discussed further herein, the speckle spectrometer section 120 can include a multi-mode waveguide (MMW) which allows the input light 102 to propagate in a relatively large number of different modes. Light in each propagation mode can constructively and/or destructively interfere with light in other propagation modes, thus creating a complex spatially-distributed pattern of speckles with varying intensities. The speckle pattern created by the speckle spectrometer section 120 also corresponds to the specific spectral content of the input light 102.

The SDFT spectrometer 100 includes, or provides, an interference region 104 where light 128 from the speckle spectrometer section 120 interferes with light 118 from the DFT spectrometer section 110. In other words, the spatially-distributed light pattern created by the speckle spectrometer section 120 is interfered with the spatially-distributed light pattern created by the DFT spectrometer section 110. This interference can include overlapping of the optical modes and/or the presence of first order interference between the optical modes of the DFT spectrometer section 110 and the speckle spectrometer section 120. In some embodiments, the interference region 104 may physically overlap or include portions of the DFT spectrometer section 110 and/or the speckle spectrometer section 120. In addition, or alternatively, the interference region 104 may be wholly or partially located external to the DFT spectrometer section 110 and/or external to the speckle spectrometer section 120.

The interference between light from the two spectrometer sections 110, 120 yields a combined interference pattern 106 which corresponds to the specific spectral content of the input light 102. Importantly, the combined interference pattern 106 can offer better optical performance (e.g., wider bandwidth, finer resolution, and/or higher finesse) than can be obtained from the respective interference patterns produced by the DFT spectrometer section 110 and the speckle spectrometer section 120, whether taken individually or even collectively but without having been interfered with one another.

The combined interference pattern 106 can be captured by an imaging detector 130 (e.g., an InGaAs detector, a charge-coupled device (CCD), a complementary metal oxide semiconductor (CMOS) imaging detector, etc.), which converts it into a plurality of electrical signals, and subsequently into a plurality of digital values. For example, the detector 130 can capture a digital value corresponding to the intensity of light in the combined interference pattern 106 at each of a plurality of spatially-separated locations within the pattern. The detector 130 can be communicatively coupled to a processor 140 which can carry out one or more processing functions, as described further herein, to convert the captured interference pattern 106 into a reconstructed spectrum for the input light 102. The reconstructed spectrum may consist of digital values corresponding to the respective magnitudes of a plurality of frequency components which make up the input light 102.

Figure 1B:
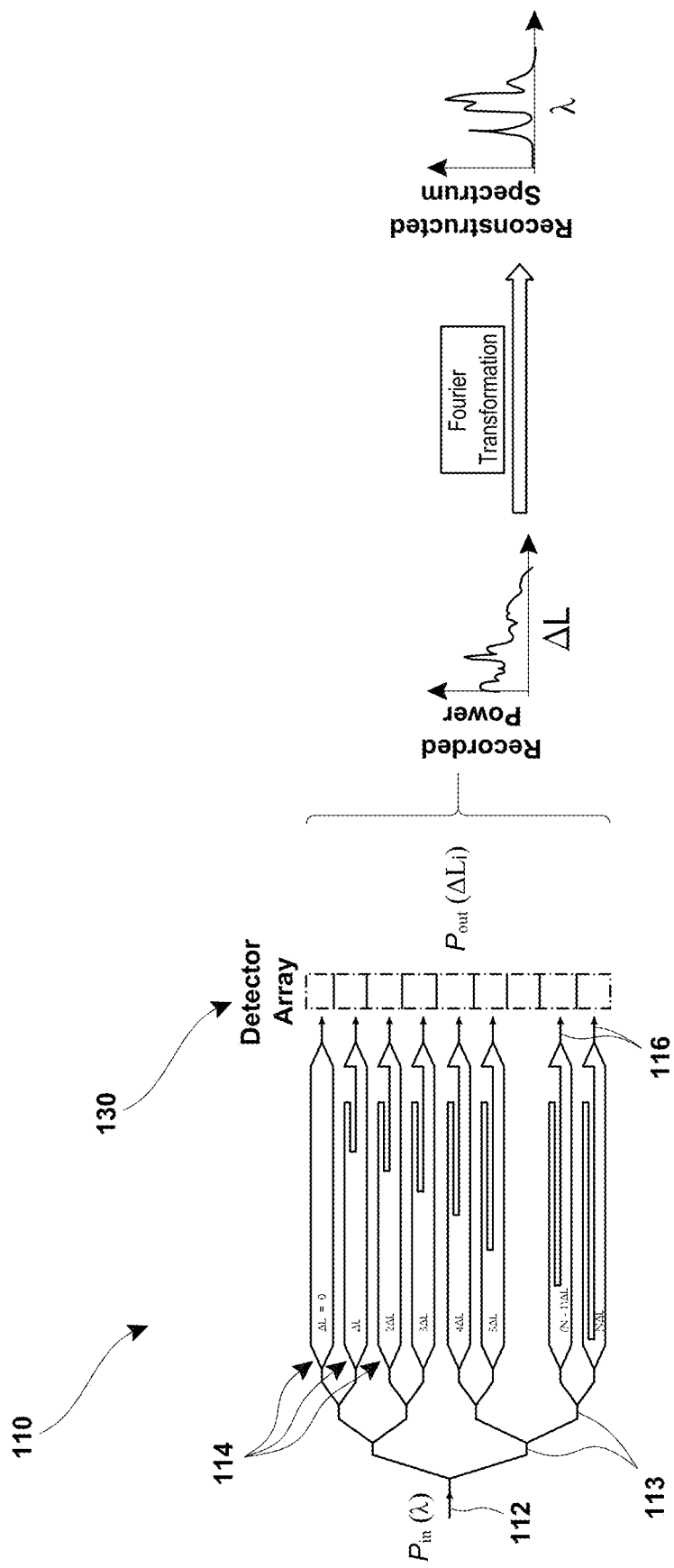
FIG. 1B illustrates an example embodiment of the structure and operation of the discrete Fourier transform (DFT) spectrometer section of the SDFT spectrometer shown in FIG. 1A.

FIG. 1B illustrates an example embodiment of the structure and operation of the DFT spectrometer section 110 of the SDFT spectrometer 100. The DFT spectrometer section 110 includes an input waveguide 112 that receives the input light 102. The optical signal corresponding to the input light 102 is referred to as $P_{in}(\lambda)$. The DFT spectrometer section 110 also includes a spatial array of N interferometers 114. In the illustrated embodiment, the interferometers 114 are Mach-Zehnder interferometers (MZIs), though other types of interferometers can be used in other embodiments (e.g., Michelson interferometers, grating interferometers, multi-beam interferometer, such as Fabry-Perot interferometers, Fizeau interferometers, multimode interferometer, etc.). The DFT spectrometer section 110 includes a plurality of splitters 113 to divide the input light 102 amongst the plurality of interferometers 114. The output light from the interferometers 114 is provided to a plurality of output ports 116. The output transmission of the interferometer array is monitored by the detector 130, which may include an array of N photodetectors corresponding to, and spatially aligned with, the output ports 116 of the N interferometers 114. In some embodiments, the DFT spectrometer section 110 can be implemented as an integrated optical chip.

As shown in FIG. 1B, each MZI 114 includes two separate optical paths (e.g., adjacent waveguides) and a splitter which divides the input light 102 amongst the two optical paths. Each MZI 114 also includes a combiner which re-combines the light that has propagated through the separate optical paths, resulting in wave interference between the two optical signals in the MZI. In the illustrated embodiment, the MZIs 114 which make up the spatial array of N interferometers have unique, fixed relative path length differences in increments of $\Delta L$ (i.e., 0, $\Delta L$, $2\Delta L$, . . . , $(N-1)\Delta L$, $N\Delta L$).

Each MZI 114 interferes the input signal $P_{in}(\lambda)$ with a time-shifted version of itself. The time shift for each MZI 114 is dependent upon the relative path length difference for that particular interferometer. The array of MZIs 114 transforms the wavelength spectrum of the input light 102 into a spatially distributed intensity pattern. In the illustrative case where $P_{in}(\lambda)$ is a monochromatic input signal, the different time shifts will result in varying degrees of constructive or destructive interference between $P_{in}(\lambda)$ and the different time-shifted versions of itself. This in turn results in a spatially-periodic distribution of power across the output ports 116 of the MZIs 114. The spectrum of $P_{in}(\lambda)$ can be calculated from the spatially-distributed output pattern from the MZIs 114 by converting the interference pattern from the spatial domain to the frequency domain. This can be done by the processor 140 using, for example, a Fourier transform, though other types of processing can also be used, as discussed below.

Since a polychromatic input signal can be represented as a linear superposition of multiple monochromatic input signals, the spatial interference pattern produced by the array of MZIs 114 in response to an input signal $S_{in}(\lambda)$ with an arbitrary spectrum is a superposition of the spatial interference patterns produced by each of the input wavelength components $P_{in}(\lambda)$. Accordingly, the spectrum of any arbitrary input signal $P_{in}(\lambda)$ can be recovered in the same way as described with respect to a monochromatic input signal.

For a light source with a given spectral distribution $S(\lambda)$, the output power of the $N^{th}$ MZI in the array 114 can be expressed as a function of its relative path difference, $$P_{N,out}(\Delta L) = \frac{1}{2}\int_0^\infty S(\lambda)\left[1 + \cos\left(\frac{\pi N}{\lambda}\Delta L\right)\right]d\lambda \tag{1}$$

The output power for the various path length differences can be measured simultaneously from the outputs 116 of the MZIs 114, and the input-output relationship can be represented with a matrix formalism using a single linear equation, $$P_{out} = A \cdot S \quad (2)$$

In Equation 2, $P_{out}$ is an N×1 matrix corresponding to the intensity pattern of the N interferometers 114. S is an M×1 matrix corresponding to M discrete wavelength steps in the reconstructed spectrum of $P_{in}$. A is an N×M wavelength vs. intensity calibration matrix. The calibration matrix, A, can be generated by recording the output intensity pattern produced by the array of N interferometers 114 in response to M narrow-band input signals at discrete wavelength steps across the bandwidth of the DFT interferometer section 110. In other words, each column of the calibration matrix, A, corresponds to the measured interference pattern produced by the DFT interferometer section 110 in response to a narrow-band input signal at a different wavelength. Typically, the M wavelength steps are evenly distributed across the bandwidth of the DFT interferometer section 110.

Conceptually, the array of MZIs 114 can be thought of collectively as a transformation operator that converts a frequency spectrum to a spatially-distributed intensity pattern. Thus, with the knowledge of the transformation operator, the spectral content of an unknown light input can be reconstructed by solving $$S = A^+ P_{out} \quad (3)$$

where $A^+$ is the pseudoinverse, a generalized inverse, of matrix A. If the number of measurements (i.e., the number of interferometers, N) is smaller than the number of wavelength points, M, to be reconstructed (i.e., N<M), then the system of linear equations is under-constrained.

Such under-constrained linear equations can be solved using, for example, least square minimization, such as an elastic-net regularization technique, $$S(\lambda) \equiv \arg\min_{S, S>0}\{\|P_{out} - A \cdot S\|^2 + \lambda_1 \|S\|_1 + \lambda_2 \|S\|^2\} \quad (4)$$

where $\lambda_1, \lambda_2$ are regularization hyperparameters that are appropriately selected depending on the density of the reconstructed spectrum. $\lambda_2 = 0$ gives a well-known $l_1$ regularization used for compressive sensing on a sparse signal, and $\lambda_1 = 0$ gives a 2-norm $l_2$ regularization (Tikhonov regularization or ridge regression) appropriate for reconstructing a dense signal.

Since the DFT spectrometer section 110 is constructed with a finite number of interferometers 114, it has a finite resolution limit and bandwidth. The spectral resolution ($\delta\lambda$) and bandwidth (B) of the DFT spectrometer section 110 are determined by the maximum ($\Delta L_{max}$) and minimum ($\Delta L_{min}$) relative path length differences of its array of N interferometers 114, $$\delta\lambda = \frac{\lambda_0^2}{\Delta L_{max} n_g} \quad (5a)$$

$$B = \frac{\lambda_0^2}{2\Delta L_{min} n_g} = \frac{N}{2}\delta\lambda \quad (5b)$$

where N is the number of discrete interferometers, $\lambda_0$ is the central wavelength in the instrument's bandwidth, and $n_g$ is the group refractive index.

As is evident from Equation 5b, the bandwidth, B, of the DFT spectrometer section 110 is proportional to the spectral resolution, $\delta\lambda$. When the spectral resolution, $\delta\lambda$, improves by becoming finer, the bandwidth, B, suffers. Conversely, when the spectral resolution, $\delta\lambda$, worsens by becoming coarser, the bandwidth, B, improves. The DFT spectrometer section 110 therefore exhibits a bandwidth-resolution tradeoff.

Figure 1C:
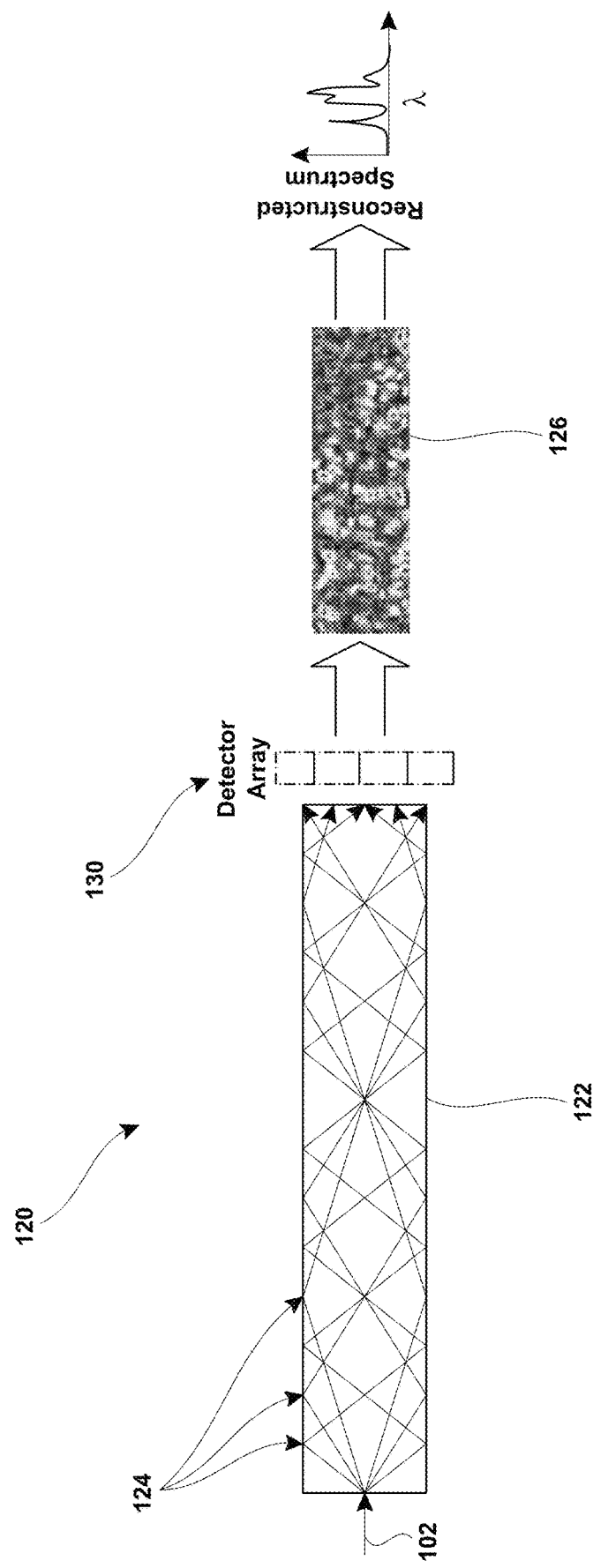
FIG. 1C illustrates an example embodiment of the structure and operation of the speckle spectrometer section of the SDFT spectrometer shown in FIG. 1A.

FIG. 1C illustrates an example embodiment of the structure and operation of the speckle spectrometer section 120 of the SDFT spectrometer 100. The speckle spectrometer section 120 includes a multi-mode waveguide (MMW) 122 that receives the input light 102. The MMW 122 can be, for example, an optical fiber or a slab waveguide. In some embodiments, the MMW can be a planar or non-planar one-dimensional, two dimensional, or three-dimensional waveguide, a rectangular waveguide, a diffused waveguide, a buried channel waveguide, a ridge channel waveguide, a strip-loaded waveguide, an arrow waveguide, a slot waveguide, a rib waveguide, a tapered waveguide, etc. In some embodiments, an array of single-mode waveguides with cross-talk across them can be used in place of the MMW 122. In some embodiments, the MMW 122 is fabricated on as part of an integrated optical chip to form a compact spectrometer.

The input light 102 propagates through the MMW 122 via a large number of distinct propagation modes 124. The optical modes 124 interfere with each other when propagated through a finite length of the MMW 122, resulting in a complex speckle pattern 126 that can be imaged by the detector 130. The speckle pattern 126 produced by the MMW 122 is a unique, repeating, frequency-dependent intensity pattern. It can therefore be processed by the processor 140 in order to reconstruct the spectrum of the input signal 102.

The speckle pattern 126 can be one- or two-dimensional (e.g., a row or matrix of intensity values). In the illustrated embodiment, the speckle pattern 126 is two-dimensional and consists of rows and columns of intensity values. In some embodiments, however, a one-dimensional speckle pattern may be measured. Or a one-dimensional speckle pattern can be obtained from the two-dimensional speckle pattern 126 by, for example, integrating the speckle pattern in one direction.

Speckle patterns can be used to form a calibration matrix, A, which can in turn be used for reconstructing an unknown spectrum in the same way as indicated by Equations 2-4. The calibration matrix, A, can be generated by recording the speckle pattern produced by the MMW 122 in response to M narrow-band input signals at discrete wavelength steps across the bandwidth of the speckle interferometer section 120. In the case where the detector 130 images a two-dimensional speckle pattern 126 produced by the MMW 122, it can be collapsed into a one-dimensional speckle pattern by integrating the speckle values in one direction. The resulting one-dimensional speckle pattern can then be a column of the calibration matrix, A. In other words, each column of the calibration matrix, A, corresponds to the measured speckle pattern produced by the speckle interferometer section 120 in response to a narrow-band input signal at a different wavelength. Typically, the M wavelength steps are evenly distributed across the bandwidth of the speckle interferometer section 120.

With a frequency-dependent calibration matrix, A, having been measured, the unknown spectrum of a light source can be re-constructed using Equations 3 and 4, where the regularization parameters $\lambda 1$, $\lambda_2$ can be selected depending on the spectral content.

The Resolution of the speckle spectrometer section 120 is determined by the change in input wavelength that is needed to decorrelate the speckle pattern 126. The spectral resolution of, for example, a multi-mode slab waveguide, such as the MMW 122 in FIG. 1C, is given as, $$\delta f \approx \frac{0.59cn}{L(NA)^2} \quad (6)$$

where n is the refractive index of the material, c is the speed of light constant, NA is the numerical aperture, and L is the length of the multi-mode waveguide 122.

The bandwidth of the MMW 122 is determined by the number of distinct speckle channels available for measurement, which is equal to the number of optical modes ($N_m$) propagating through the waveguide. The number of optical modes supported by a planar waveguide, $$N_m = \frac{2d}{\lambda_0}$$

NA, is proportional to the width of the waveguide (d) and its NA. The bandwidth (B) of such a MMW is given as $B \sim (N_m-1)\delta v$, and is approximately equal to the number of modes multiplied by the resolution.

Since the bandwidth of the speckle spectrometer section 120 is approximately proportional to its spectral resolution, it too exhibits a resolution-bandwidth tradeoff which may limit the versatility of such a speckle spectrometer, requiring a designer to make a compromise on one of the parameters.

With existing DFT spectrometer technologies, a large number of interferometers would typically be required in order to simultaneously achieve large bandwidth and high resolution. This results in a relatively large device footprint that comes with significant optical loss. With existing speckle spectrometer technologies, two separate speckle spectrometer devices—a coarse-resolution device and a fine-resolution device—would typically be required in order to simultaneously achieve large bandwidth and high resolution. Thus, with existing DFT spectrometer and speckle spectrometer technologies, a large-bandwidth, high-resolution spectrometer would require undesirable complexity in terms of fabrication and/or operation of the spectrometer.

The SDFT spectrometer 100 described herein can overcome these problems, however, by extending the spectral resolving power of a wide-bandwidth DFT chip by combining it with, for example, the speckle pattern generated by the light propagating through the substrate of a rough wafer. The SDFT spectrometer 100 has a calibration matrix, A, that is influenced by two calibration matrices—a DFT calibration matrix and a speckle calibration matrix—with different spectral-spatial map properties that provides a less restrictive resolution-bandwidth tradeoff.

In some embodiments of the SDFT spectrometer 100, in order to achieve a high signal-to-noise ratio (SNR) reconstruction of the spectrum of the input light 102, the bandwidth of the speckle spectrometer section 120 can be greater than or equal to the resolution of the DFT spectrometer section 110. This condition allows every dense signal spectra within the bandwidth of the speckle spectrometer section 120 to be reconstructed. In some embodiments, the SDFT spectrometer 100 can be used to reconstruct sparse, high-resolution signals with compressive sensing with a tradeoff of SNR. In such embodiments, the DFT spectrometer section 110 can have a resolution could be larger than the bandwidth of the speckle spectrometer section 120. For example, the resolution of the DFT spectrometer section 110 can be up to 5 times greater than the bandwidth of the speckle spectrometer section 120, or up to 10 times greater, or up to 15 times greater, or up to 20 times greater.

Figure 2A:
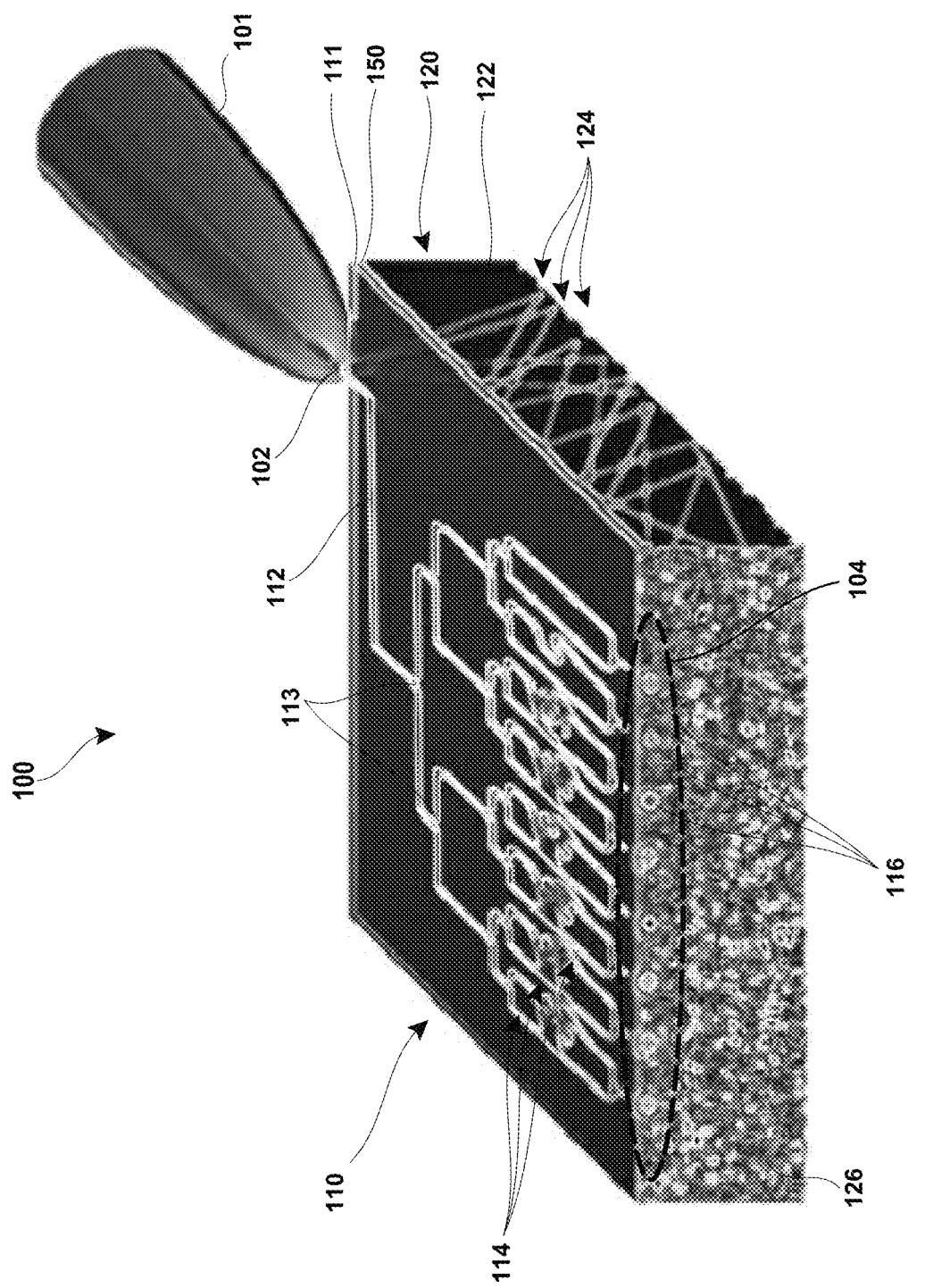
FIG. 2A illustrates an example embodiment of the structure of the SDFT spectrometer shown in FIG. 1A.

FIG. 2A illustrates an example embodiment of the structure of the SDFT spectrometer 100. As already discussed, the SDFT spectrometer 100 includes a DFT spectrometer section 110 and a speckle spectrometer section 120. In the illustrated embodiment, the DFT spectrometer section 110 and the speckle spectrometer section 120 are provided together in a single integrated optical chip. The integrated optical chip can be made of, for example, silicon-on-insulator (SOI), lithium niobate (LiNbO3), silicon oxynitride, type III-V semiconductor, sapphire, polymer, or a heterostructure of hybrid materials, depending on the desired operating wavelength, though other materials can also be used.

The speckle spectrometer section 120 of the SDFT spectrometer 100 includes a multi-mode waveguide (MMW) 122. As discussed herein, the MMW 122 carries multiple propagation modes of light which create the speckle interference pattern 126 that is used to enhance the optical performance of the instrument. In addition to serving as a waveguide, the MMW 122 also acts as a substrate to provide mechanical support for the DFT spectrometer section 110. Thus, the MMW 122 has a synergistic effect because it can perform the mechanical support role which would be needed in any integrated chip DFT spectrometer but also can enhance the optical performance of the instrument with little or no increase in size and/or weight.

An interferometer layer 111 can be formed over the MMW 122 with a buffer layer 150 separating the two. Portions of the interferometer layer 111 can be etched away (e.g., using photolithography techniques), or otherwise patterned, to form the array of N interferometers and/or other components of the DFT spectrometer section 110. These components can include, for example, waveguides, Y-splitters, Y-combiners, etc. As already discussed, in some embodiments, the interferometers are MZIs 114 with varying differential path lengths. Input light 102 can be distributed to the array of N MZIs 114 using, for example, the input waveguide 112 and N Y-splitters 113. Each of the MZIs 114 can include a Y-combiner to re-combine the light that has propagated through the differential optical paths. The light from the MZIs can then be provided to respective output ports 116. The output ports 116 for the array of N MZIs 114 can be provided at an end face of the optical chip, as shown in FIG. 2A. In some embodiments, an additional protective layer of material (e.g., oxide) can be provided over the MZIs 114 to seal them and reduce the thermal sensitivity of the instrument. In embodiments where the protective layer is present, it can be, for example, up to several mm thick, though a variety of materials and thicknesses can be used.

Figure 2B:
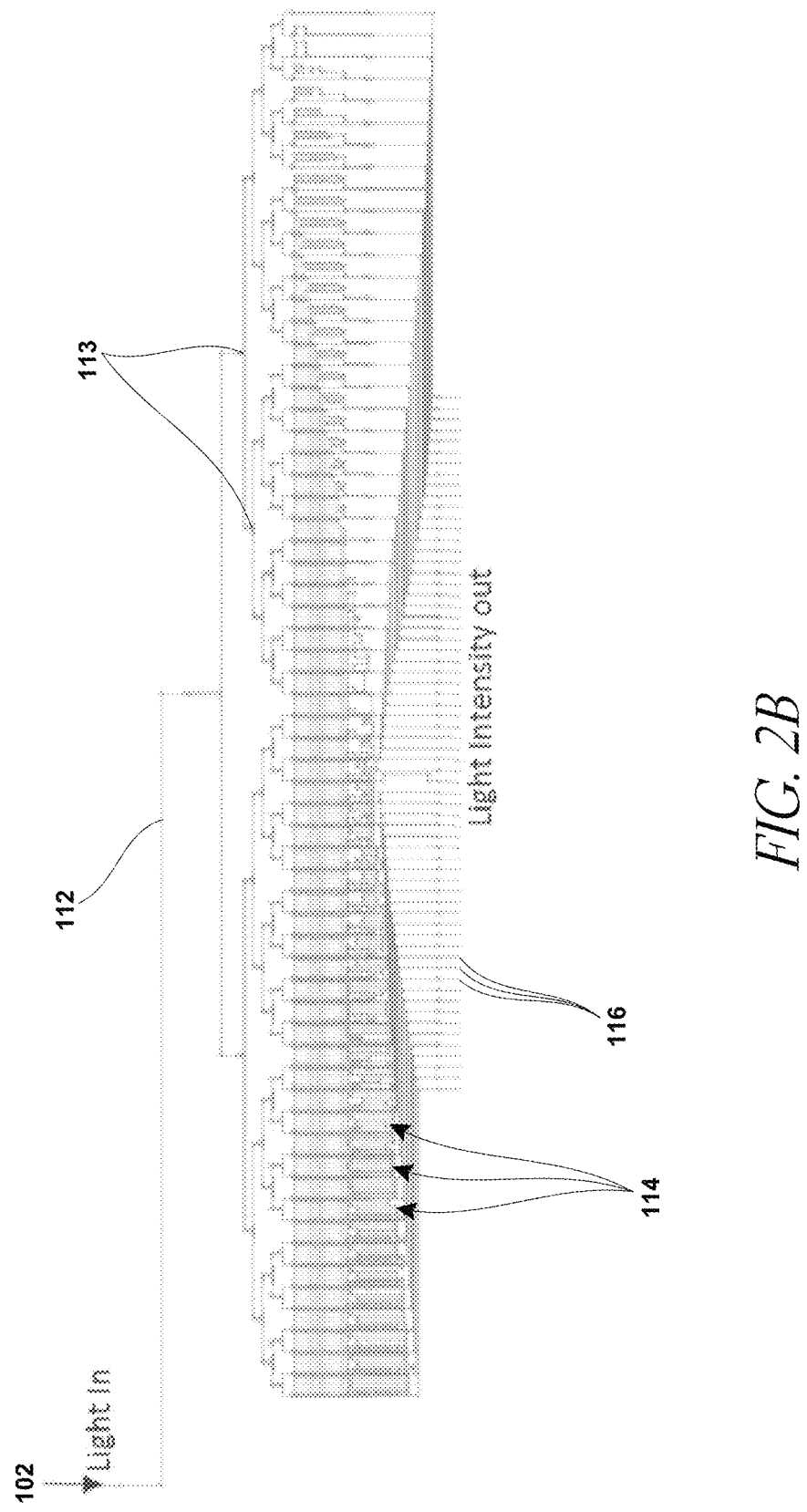
FIG. 2B illustrates a more detailed example embodiment of the layout of the components of the DFT spectrometer section of the SDFT spectrometer shown in FIG. 2A.

FIG. 2B illustrates a more detailed example embodiment of the layout of the components of the DFT spectrometer section 110 which can also be seen in FIG. 2A. For example, FIG. 2B shows the input waveguide 112, the splitters 113, the array of N MZIs 114, and the outputs 116. In some embodiments, the array can include as few as two MZIs 114 or as many MZIs as can be fabricated, given size and manufacturing technology constraints. As illustrated, the throughput of the DFT spectrometer section 110 can be increased by parallelizing the input light 102, where instead of splitting a single waveguide into multiple interferometers, the different MZIs 114 with varying lengths can be all coupled in parallel to the input light, thus giving Jacquinot's advantage. In the illustrated embodiment, the input waveguide 112 is misaligned from the output waveguides 116 to minimize or reduce the impact of any leaked stray light propagating on top of the device that otherwise could saturate detector arrays.

In the embodiment of the SDFT spectrometer 100 which is shown in FIG. 2A, the device receives input light 102 from a tapered optical fiber 101 that is butt-coupled to an input end face of the device. A portion of the input light 102 enters a guided propagation mode in the input waveguide 112 of the DFT spectrometer section 110. The light is then distributed by the splitters 113 to the MZIs 114 and ultimately exits from the output ports 116. In some embodiments, the dimensions (e.g., thickness and width) of the waveguides which make up the inputs, splitters, interferometers, and outputs of the DFT spectrometer section 110 can be designed to support a few optical modes (e.g., $TE_{00}$ and $TM_{00}$ modes), or even just a single mode. For example, in some embodiments the interferometer layer 111 can be 0.031-0.4$\lambda_0$ thick and the waveguides can be 0.13-1.0$\lambda_0$ wide (though other dimensions can also be used), where $\lambda_0$ is the center operating wavelength of the SDFT spectrometer 100.

Another portion of the input light 102 from the tapered optical fiber 101 enters a plurality of guided propagation modes 124 in the MMW 122. The thickness of the MMW 122 helps to determine the number of guided propagation modes in the speckle spectrometer section 120. In some embodiments, the thickness of the substrate 122 may be 10-1000$\lambda_0$, though other thicknesses can also be used. In some embodiments, the MMW 122 supports >10 guided propagation modes, or, in other embodiments, >$10^2$ guided propagation modes, or, in still other embodiments, >$10^3$ or >$10^4$ guided propagation modes. The plurality of guided propagation modes 124 constructively and destructively interfere with one another and create a speckle pattern 126 at the output end face of the SDFT interferometer 100. And, as discussed further herein, the speckle pattern 126 interferes with the outputs 116 of the MZIs 114 in the interference region 104 so as to enhance the performance of the instrument.

Once again, a buffer layer 150 can be provided between the MMW 122 and the interferometer layer 111. The buffer layer 150 can have a refractive index that is less than the refractive indexes of the MMW 122 and the interferometer layer 111. Thus, the buffer layer 150 can act as cladding so as to allow light to be supported in separate guided propagation modes in the MMW 122 and in the interferometer layer 111. In some embodiments, the difference between the refractive index of the buffer layer 150 and the refractive indexes of the MMW 122 and the interferometer layer 111 can be 0.001 to as large as possible, given material constraints in the selected manufacturing process. The buffer layer 150 is preferably thick enough to allow separate propagation of the input light 102 through the DFT spectrometer section 110 and the speckle spectrometer section 120 but not so thick as to prevent interference of the light 118, 128 from the two sections in the interference region 104. In some embodiments, the thickness of the buffer layer 150 may be 0.1-3.0$\lambda_0$, though other thicknesses can also be used.

Figure 2C:
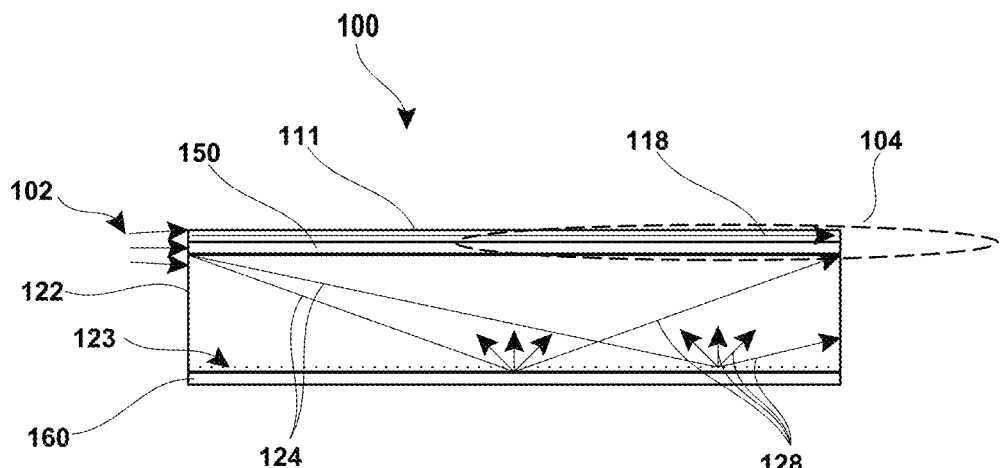
FIG. 2C is a cross-sectional view of the example embodiment of the SDFT spectrometer 100 shown in FIG. 2A.

FIG. 2C is a cross-sectional view of the example embodiment of the SDFT spectrometer 100 shown in FIG. 2A. The cross-sectional view in FIG. 2C shows the multi-mode waveguide (MMW) 122 of the speckle spectrometer section 120, the buffer layer 150 over the MMW 122, and the interferometer layer 111 of the DFT spectrometer section 110 over the buffer layer 150. FIG. 2C also shows the input light 102 entering the input end face of the SDFT spectrometer 100.

Figure 2D:
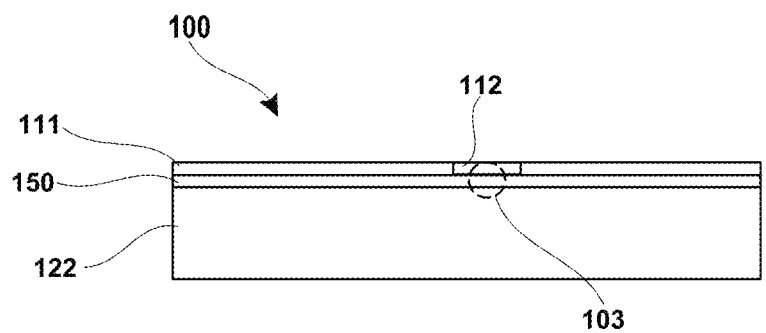
FIG. 2D illustrates an example embodiment of how input light can be coupled into the SDFT spectrometer shown in FIG. 2A.

As discussed further with respect to FIG. 2D, the input light 102 forms a spot on the input end face of the SDFT spectrometer 100. In some embodiments, the input light spot may be positioned and sized so as to at least partially overlap the interferometer layer 111 and the MMW 122. Thus, the input light 102 enters guided propagation modes within both of these layers (and, hence, within both the DFT spectrometer section 110 and the speckle spectrometer section 120) simultaneously so as to propagate through both sections of the SDFT spectrometer 100 in parallel.

FIG. 2C also illustrates that some embodiments of the MMW 122 have a roughened bottom surface 123 with many scattering features. As shown in FIG. 2C, light propagating in the guided modes 124 within the MMW 122 is scattered by the roughened bottom surface 123. Some of the scattered light 128 is disrupted from the original guided modes 124. The scattered light rays 128 may enter new guided propagation modes within the MMW 122, or they may have propagation angles that do not undergo total internal reflection and therefore prematurely exit the MMW 122, prior to reaching the output end face, and interfere with the light 118 propagating in the interferometer layer 111 of the DFT spectrometer section 110.

The roughened bottom surface 123 of the MMW 122 can improve the resolution of the SDFT spectrometer 100 by increasing the number of, and mixing between, guided propagation modes in the MMW 122, thus enhancing the wavelength dependence of the speckle pattern 126. The roughened bottom surface 123 of the MMW 122 can also enhance the interference between the light 128 from the speckle spectrometer section 120 and the light 118 from the DFT spectrometer section 110 in the interference region 104, which can also improve optical performance of the instrument.

In some embodiments, the scattering mean-free path length (l) of the roughened bottom surface 123 can be smaller than the MMW length (L), such that light scatters multiple times while propagating through the MMW 122. In some embodiments, the roughened bottom surface 123 may be made up of sub-wavelength scattering features having dimensions that are 0.2-5$\lambda_0$, though other dimensions can also be used. The roughened bottom surface 123 may be formed by, for example, polishing the MMW 122 using a rough grinder, using focused ion beam (FIB) sputtering or milling, using chemical or electron beam etching, by embedding dense sub-wavelength particles inside the waveguide, etc.

Although FIG. 2C shows that scattering features are formed on the bottom surface of the MMW 122, they can also, or alternatively, be provided at other locations. For example, scattering features can be provided on other surfaces of the MMW, such as the top surface or side surfaces. In addition, scattering features can be provided inside the volume of the MMW. The scattering features can be laid out in an ordered or disordered manner.

The roughened bottom surface 123 can improve the resolution of the SDFT spectrometer 100 by multiple orders of magnitude. For example, the measured resolution for one embodiment of the SDFT spectrometer was two times better than the predicted resolution for the same spectrometer without the roughened bottom surface 123. Again, this improved performance is at least partially attributable to the increased number of optical modes that are occupied by the light propagating through the MMW 122 as a result of the scattering features on the roughened bottom surface 123. The wavelength-dependent mode mixing is also increased by the scattering features, thus further improving optical performance of the instrument.

For a multi-mode fiber speckle spectrometer with no mode scrambling caused by scattering features, the resolution of the device can be shown to scale as 1/L, where L is the length of the fiber. An optical beam propagating through a long fiber (tens of meters) with surfaces roughened with scattering features undergoes mode selective attenuation, and the resolution of a speckle spectrometer built out of such fiber is believed to scale as $$\frac{1}{\sqrt{L}}.$$

On the other hand, it has been shown that light propagating in a dense scattering medium undergoes multiple volume-like scatterings and exhibits localization behavior where the transmission power drops quadratically or exponentially. The half-width at half-maximum (HWHM) speckle correlation of such system scales as $$\frac{1}{L^2},$$

$$\Delta f_{HWHM}(L) = 0.45 \frac{D}{L^2} \quad (7)$$

where D is the diffusion coefficient. This $L^2$ behavior has been experimentally verified on a chip-scale device by building a speckle spectrometer with light scattered from sub-micron photonic crystal structures. Similarly, it has been shown that surface-disordered waveguides exhibits all three transport regimes—ballistic, diffusive, and localization— depending on the surface roughness. When the scattering length (l) is a fraction of the propagating wavelength, for a waveguide with length L>>$N_m$l, some of its optical modes are localized. This results in a quadratic or an exponential drop in the transmission power as a function of length, a characteristic behavior of localization. In some embodiments of the SDFT spectrometer 100, the surface-roughness of the MMW 122 is within the required parameter for localization. Thus, the enhancement in the spectral resolution in the SDFT spectrometer 100 may be at least partially due to the increase in intermodal dispersion—or mixing between propagation modes—resulting from scattering features on the roughened surface of the MMW 122.

As just discussed, the resolution of the spectrometer can be enhanced, and/or the device footprint can be decreased, by exploiting the $L^2$ dependence using an MMW 122 with scattering features (e.g., on roughened bottom surface 123). In such embodiments, one or more reflective surfaces 160 can be added to the MMW 122 to at least partially counteract the possible reduction in signal-to-noise ratio (SNR) that may occur due to the quadratically- or exponentially-reduced transmission power, where some of the power reflects or radiates from the surfaces of the device other than the output end face. For example, in some embodiments of the SDFT spectrometer 100, one or more surfaces of the optical chip—except the output end face—can be provided with a reflective surface or layer 160, which increases the total light reaching the output end face of the optical chip. In addition, multiple reflections arising from such reflective surfaces would fold the propagation length of light, allowing for reduction of the device footprint while further enhancing the resolution. In some embodiments, the reflective surface 160 has a reflectance of 80-100%, though other reflectances can also be used.

FIG. 2D illustrates an example embodiment of how input light 102 can be coupled into the SDFT spectrometer 100. FIG. 2D shows the input end face of the embodiment of the SDFT spectrometer 100 shown in FIG. 2A, including the multi-mode waveguide (MMW) 122 of the speckle spectrometer section 120, the buffer layer 150, and the interferometer layer 111 (with the input waveguide 112) of the DFT spectrometer section 110.

One or more optical components can be provided to form an input light spot 103 on the input end face of the SDFT spectrometer 100. In some embodiments, the diameter of the input light spot 103 is at least greater than the thickness of the buffer layer 150, or, in other embodiments, greater than the combined thickness of the interferometer layer 111 and the buffer layer 150. In addition, the one or more optical components which produce the input light spot 103 can be misaligned with respect to the input waveguide 112 such that the input light spot 103 at least partially overlaps the both the input waveguide 112 of the DFT spectrometer section 110 and the MMW 122 of the speckle spectrometer section 120, as shown in FIG. 2D. This allows simultaneous launching of the input light 102 in guided propagation modes in both the DFT spectrometer section 110 and the speckle spectrometer section 120 of the SDFT spectrometer 100.

In some embodiments, the input light 102 is coupled into the SDFT spectrometer 100 by focusing it with a high NA lens onto the input end face of the device, v-grooved edge coupling or by butt-coupling one or more optical fibers to the device. In the case of an optical fiber input, to increase the coupling of the input light into the MZIs 114, a lensed fiber end can be used. Additionally, an inverse taper structure can be used at the output end of the waveguide. The inverse taper structure can increase the smaller mode area of the input waveguide 112 to match with a larger fiber mode area or MMW 122.

Although only a single input light spot 103 is illustrated in FIG. 2D, in other embodiments the input light 102 from the optical source whose spectrum is to be measured can be split and then two separate input light spots 103 can be projected onto the input end face of the SDFT spectrometer 100. For example, the input light 102 can be coupled into an optical fiber and then passed through a Y-splitter which has two outputs. One of the Y-splitter outputs can be aligned with the input waveguide 112 of the DFT spectrometer section 110, while the other Y-splitter output can be aligned with the MMW 122 of the speckle spectrometer section 120. Similarly, the input light 102 can be passed through a beamsplitter and can then be projected onto the input waveguide 112 of the DFT spectrometer section 110 and onto the MMW 112 of the speckle spectrometer section 120 by two separate focusing elements.

Figure 2E:
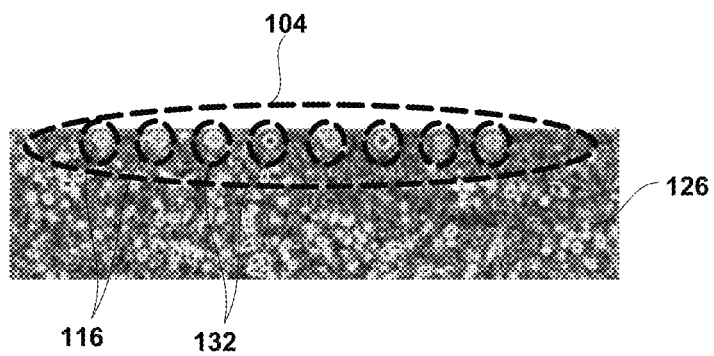
FIG. 2E illustrates an example view of the output end face of the SDFT spectrometer shown in FIG. 2A.

FIG. 2E illustrates an example view of the output end face of the SDFT spectrometer 100. While in operation, the DFT spectrometer section 110 produces a wavelength-dependent spot at each of the outputs 116 of the MZIs 114 in the output end face. These spots are located in the interferometer layer 111 of the SDFT spectrometer 100 near the top of the output end face. Meanwhile, the speckle spectrometer section 120 produces a wavelength-dependent speckle pattern 126 at the output end face, as shown in FIG. 2D.

Wave interference occurs between the light 118 which forms the output spots of the DFT spectrometer section 110 and the light 128 from the speckle spectrometer section 120 which forms the speckle pattern 126. This wave interference occurs in the interference region 104. In the illustrated embodiment, the interference region 104 encompasses a volume around the outputs 116 of the MZIs 114.

The detector 130 collects light from the interference region 104. In some embodiments, the detector 130 can include one or more focusing elements to collect light from the interference region 104. For example, in some embodiments, the detector 130 can include an objective lens that focuses light from the output detection areas 132 onto a one- or two-dimensional array of photodetectors. In other embodiments, the photodetectors may simply be butt-coupled to the output end face of the SDFT spectrometer 100. In other embodiments, the photodetectors may be integrated to the end face of the SDFT spectrometer 100 using lithographically-defined detector elements.

In some embodiments, the detector 130 is an imaging detector that includes a spatial array of photodetectors. Each of the photodetectors (or a subset group of photodetectors) collects light from an output detection area 132 surrounding an output spot of the DFT spectrometer section 110. The size(s) and/or location(s) of the output detection areas 132 can be selected based on the desired degree of influence of the speckle pattern 126 on the intensity value recorded for each output detection area 132. For example, if a lesser amount of speckle enhancement is desired for a particular output reading, the detector 130 can be configured such that the output detection areas 132 closely match the sizes and shapes of the spots produced at the outputs 116 of the MZIs 114 in the DFT spectrometer section 110. If a greater degree of speckle enhancement is desired for a particular output reading, the detector 130 can instead be configured such that the output detection areas 132 are sized and/or shaped so as to collect light from regions surrounding the outputs 116 of the MZIs 114. Similarly, if speckle-only data is desired for a particular output reading, the detector 130 can instead be configured such that the output detection areas 132 are located well away from the MZI outputs 116.

In some embodiments, the detector 130 includes a two-dimensional array of photodetectors that can collect light from a plurality of different sets of detection areas 132. The output readings of the SDFT spectrometer 100 can then be selected from one of the sets of detection areas 132 (e.g., in post processing) based on the desired degree of speckle enhancement. For example, if relatively little speckle enhancement is desired, the output readings can be taken from a row of photodetectors which are closely aligned with the outputs 116 of the MZIs 114. If, however, more speckle enhancement is desired, the output readings can be taken from a lower row of photodetectors which are somewhat offset from the outputs 116 of the MZIs 114.

Figure 2F:
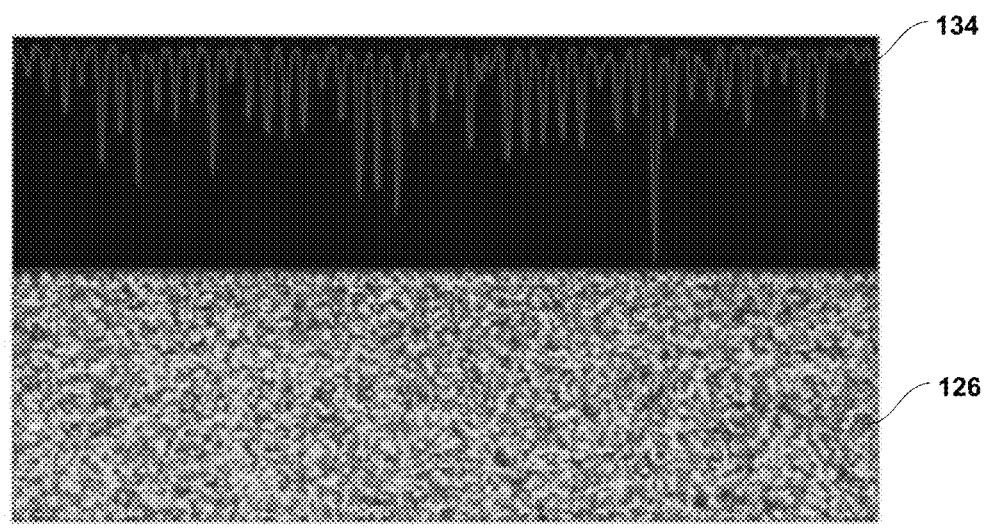
FIG. 2F shows an example of the output data provided by the SDFT spectrometer shown in FIG. 2A.

FIG. 2F shows an example of the output data provided by the SDFT spectrometer 100. The bottom portion of FIG. 2F is an image of the speckle pattern 126 that is produced at the output end face of the SDFT spectrometer 100. The top portion of FIG. 2F is a graph of the intensity values 134 recorded from the output detection areas 132 shown in FIG. 2E.

The optical performance of various embodiments of the SDFT spectrometer 100 has been validated through both simulation and physical experimentation. In some embodiments, the SDFT spectrometer 100 can achieve bandwidths of 0.1-200 nm and resolutions of 1 pm-0.1 nm. In some embodiments, the SDFT spectrometer 100 can achieve finesse of $10^3$ or more, $10^4$ or more, or $10^5$, or more.

The optical performance of the SDFT spectrometer 100 can be determined via simulation by calculating the electric fields respectively produced by the DFT spectrometer section 110 and the speckle spectrometer section 120 and then calculating the combination interference pattern 106 that results from wave interference between those electric fields.

The electric field of the optical modes propagating through the MMW 122 with length L can be written as, $$E_{speckle}(r,\theta,\lambda,L) = E_m C_m \psi_m(r,\theta,\lambda)\exp[-i(\beta_m(\lambda)L - \omega t + \phi_m)] \quad (8)$$

where $\psi_m$ is the spatial profile of the mth mode that has initial amplitude $C_m$ and phase $\phi_m$ with propagation constant $\beta_m$.

The electric field of the MZI output 116 for a single mode field is, $$E_{MZI}(r, \theta, \lambda, L) = C\sum_{n=1}^{N} \psi_n(r, \theta, \lambda)\exp[i\phi]\cos[\beta_n(\lambda)\Delta L_n] \quad (9)$$

where $\Delta L_n$ is the relative path-length difference of the nth MZI 114.

The electric fields produced by the DFT spectrometer section 110 and the speckle spectrometer section 120 can then be summed. With the total electric field known, the intensity of the light in each output detection area 132 can be calculated. In addition, the calibration matrix, $A_{SDFT}$, for the SDFT spectrometer 100 can be simulated by calculating the intensity values recorded by the detector 130 at the output detection areas 132 for each of a plurality of input wavelengths spaced across the bandwidth of the instrument.

The output of the SDFT spectrometer 100, consisting of the speckle pattern and the MZI output, can be written as, $$P_{out} = A_{MZI} \cdot S + A_{speckle} \cdot S + A_{sp*mz} \cdot S \equiv A_{SDFT} \cdot S \quad (10)$$

where the calibration matrix, $A_{SDFT}$, is the sum of the calibration matrix, $A_{MZI}$, corresponding to the DFT spectrometer section 110, the calibration matrix, $A_{speckle}$, corresponding to the speckle spectrometer section 120, and a new calibration matrix term, $A_{sp*mz}$, that could arise due to the interference between modes from both systems (i.e., $P \propto |E_{MZI} + E_{spec}|^2$). This combined calibration matrix, $A_{SDFT}$, is capable of simultaneously resolving a dense, high-resolution, and broad spectrum. The combined calibration matrix, $A_{SDFT}$, can be used to reconstruct the spectrum of an input signal using, for example, the techniques of Equations 2-4. The combined calibration matrix, $A_{SDFT}$, can be generated by recording the intensity values at the output detection areas 132 in response to M narrow-band input signals at discrete wavelength steps across the bandwidth of the SDFT spectrometer 100. In other words, each column of the combined calibration matrix, $A_{SDFT}$, corresponds to the measured combined interference pattern 106 in response to a narrow-band input signal at a different wavelength. Typically, the M wavelength steps are evenly distributed across the bandwidth of the SDFT spectrometer 100.

Figure 3A:
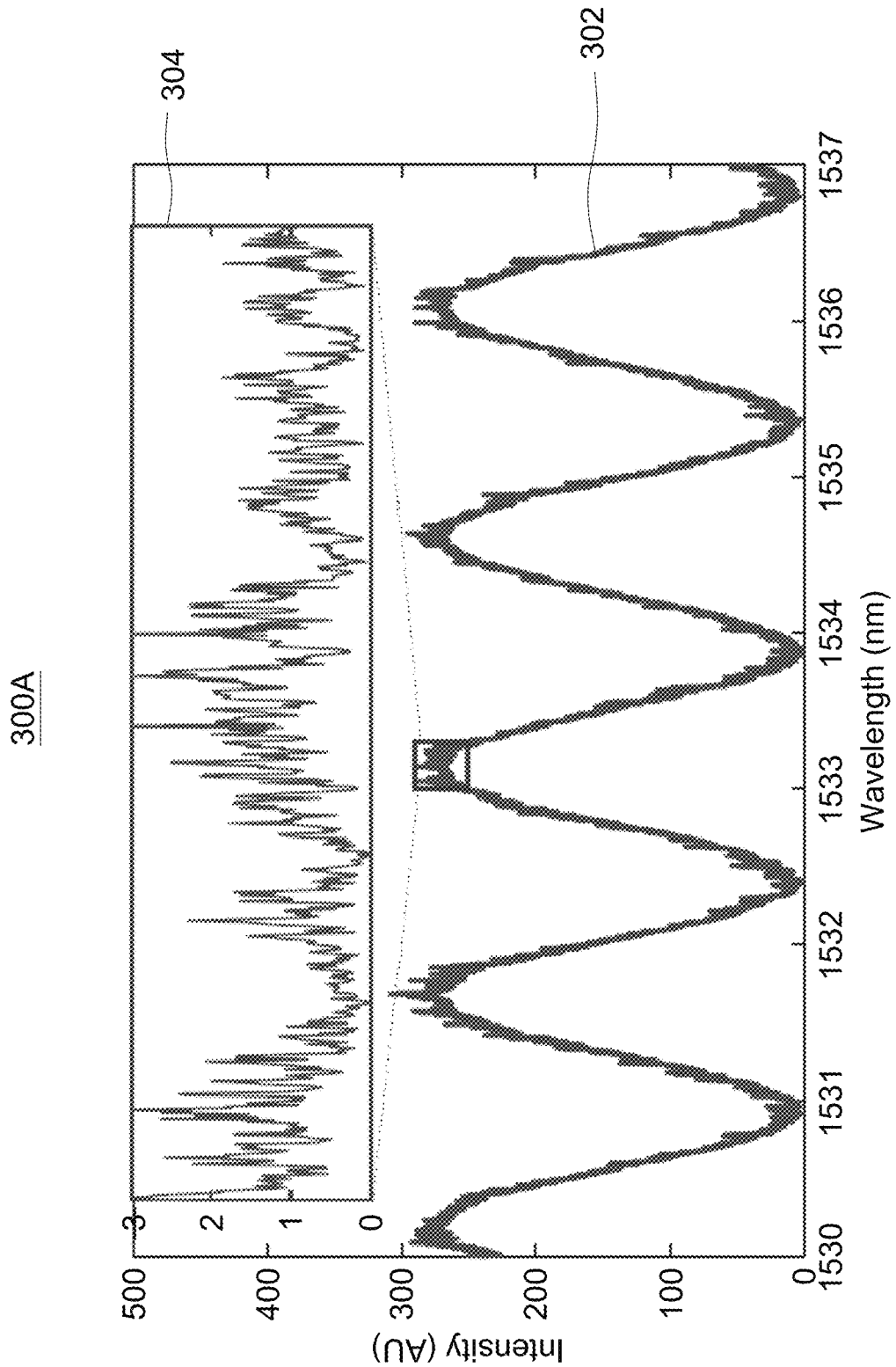
FIG. 3A is a plot of the simulated output for an example embodiment of the SDFT spectrometer of FIG. 2A.

FIG. 3A is a plot 300A of the simulated output 302 for an example embodiment of the SDFT spectrometer 100. The simulated example embodiment of the SDFT spectrometer 100 had a DFT spectrometer section 110 with 64 MZIs 114 whose relative path length differences increased in increments of 50 um. The MZIs 114 were implemented using simulated 500 nm wide silicon on insulator (SOI) waveguides on a 220 nm thick silicon layer. The MZI outputs were calculated using Equation 9. The simulated example embodiment of the SDFT spectrometer 100 had a speckle spectrometer section 120 with a 500 µm thick slab silicon MMW 122. The speckle pattern 126 was calculated using Equation 8. The spectral correlation width of the speckle spectrometer section 120 was simulated to be ~150 MHz so that it matched the experimental data obtained during physical testing of an example embodiment of the SDFT spectrometer 100, as discussed further below.

FIG. 3A shows a curve 302 which plots the total transmission power as a function of input wavelength at a single output detection area 132 of the SDFT spectrometer 100. The data shows the intensity values which resulted from interference of the speckle electric field with the electric field produced by an MZI 114. In this case, the output detection area 132 was selected such that the relative mean intensity of the speckles was ~10% of the MZI intensity, though other percentages, such as 5-100%, can also be used.

FIG. 3A illustrates the relatively slowly varying nature of the MZI output along with the relatively rapidly changing speckle pattern as a function of the input wavelength. The relatively fast-changing speckle data rides the relatively slowly-varying MZI intensity curve as a small intensity perturbation. When reconstructing a broad spectrum, the speckle data averages out allowing one to accurately reconstruct a broad spectrum. On the contrary, for a small spectral window of interest (plotted in the inset 304), the speckle data changes relatively rapidly while the MZI output acts substantially as a DC offset. This behavior allows the SDFT spectrometer 100 to robustly reconstruct a closely spaced, high-resolution spectrum. This complementary nature of the SDFT spectrometer 100 makes it suitable for both high-resolution and broadband spectral reconstruction.

Figure 3B:
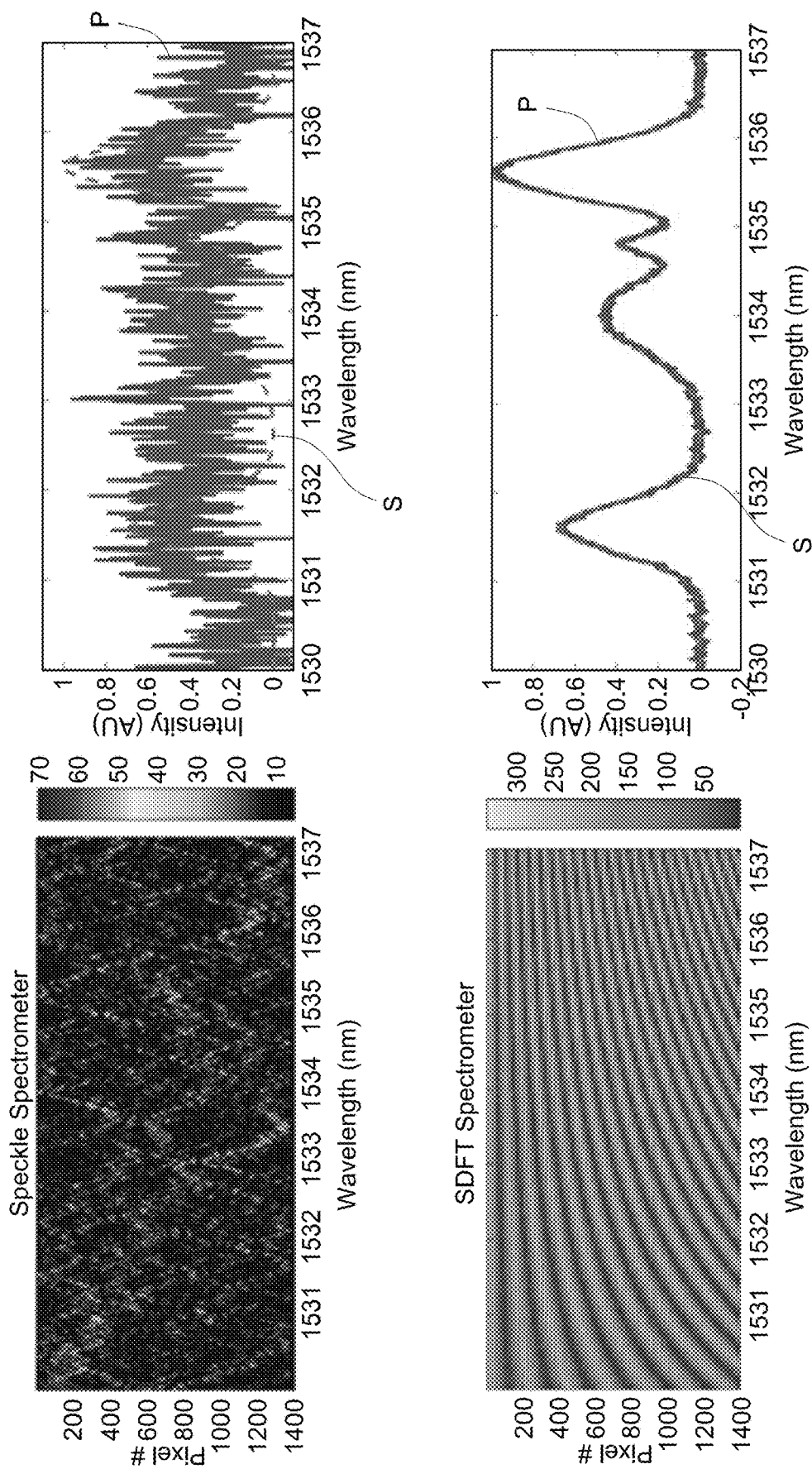
FIG. 3B illustrates the simulated performance of a speckle-only spectrometer in comparison to the SDFT spectrometer of FIG. 2A for an input spectrum with coarse spectral features.
Figure 3C:
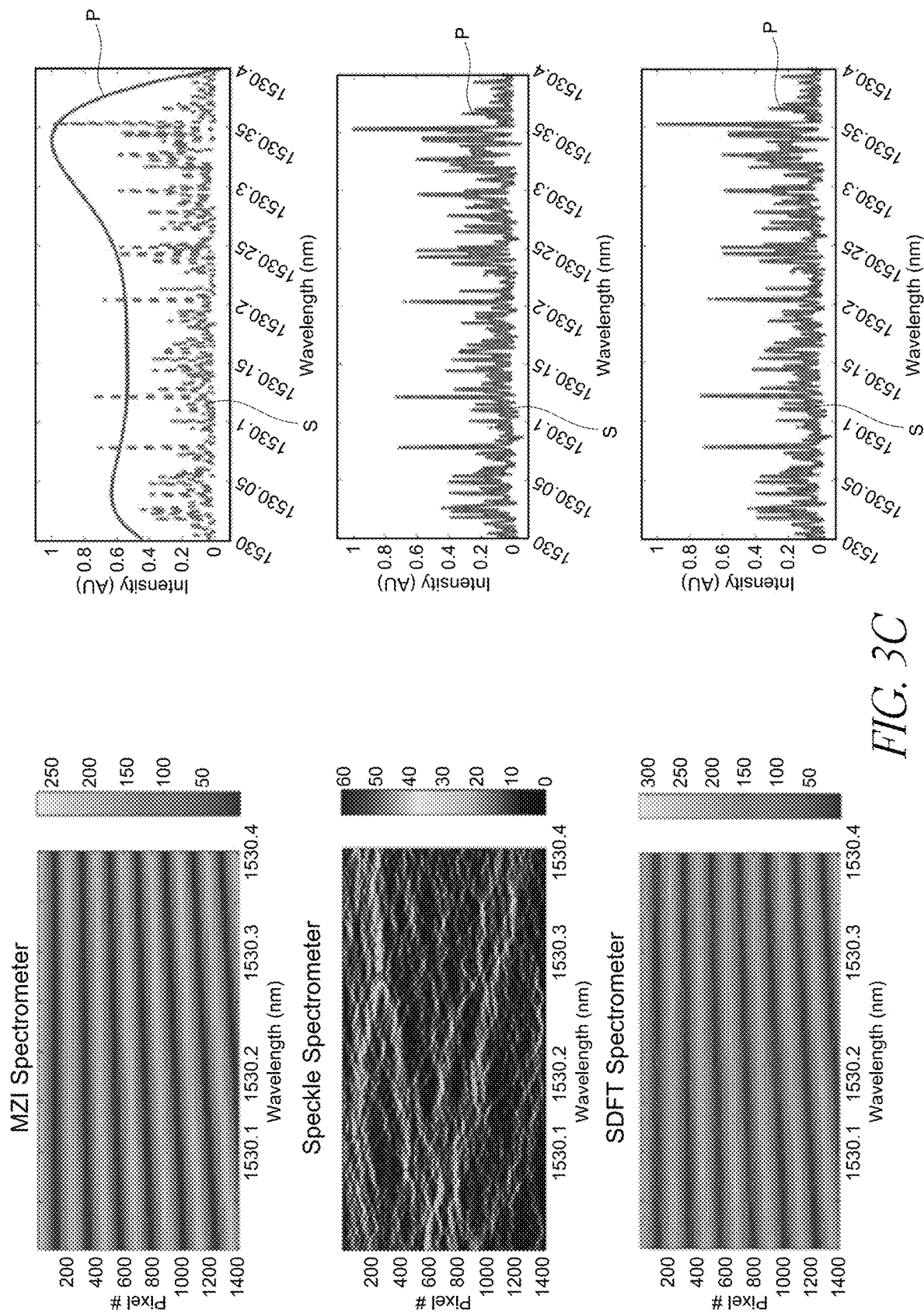
FIG. 3C illustrates the simulated performance of DFT-only and speckle-only spectrometers in comparison to the SDFT spectrometer of FIG. 2A for an input spectrum with fine spectral features.

The simulated performance of the SDFT spectrometer 100 in FIG. 3A is compared to the simulated performance of speckle-only and DFT-only spectrometers for broad and narrow band input spectrums in FIGS. 3B and 3C.

FIG. 3B illustrates the simulated performance of a speckle-only spectrometer in comparison to the SDFT spectrometer 100 for an input spectrum with coarse spectral features. The simulated calibration matrix, $A_{speckle}$, for the speckle-only spectrometer is shown in the upper left panel of FIG. 3B. $A_{speckle}$ includes the one-dimensional speckle pattern recorded by a row of 1400 pixels of the detector 130 for each of many input wavelengths over the relatively broad bandwidth of 1530-1537 nm. $A_{speckle}$ was generated using Equation 8.

The upper right panel of FIG. 3B shows the input spectrum, S, (shown with the dashed line) and the output spectrum, P, which was reconstructed by the speckle-only spectrometer. In this case, the input spectrum, S, includes only course spectral features. The reconstructed output spectrum, P, was generated using the technique of Equations 2-4.

As is evident from inspection, the calibration matrix, $A_{speckle}$, for the speckle-only spectrometer exhibits a pseudo-periodic behavior with changing wavelength. The number of speckle patterns is proportioned to the number of optical modes sustained in a multimode waveguide, so a high-resolution speckle calibration matrix can provide a unique fingerprint only for a limited bandwidth (B), beyond which the speckle pattern tends to repeat with the change in input wavelength. In other words, the speckle pattern exhibits relatively low autocorrelation under relatively small wavelength shifts but higher autocorrelation under relatively large wavelength shifts. This results in poor reconstruction of coarse spectral features when using the speckle-only calibration matrix, $A_{speckle}$, beyond its bandwidth. This is evident from the upper right panel of FIG. 3B, where it is clear that the reconstructed output spectrum, P, is not an accurate representation of the broadband input spectrum, S.

The lower right panel of FIG. 3B shows the simulated calibration matrix, $A_{SDFT}$, for the SDFT spectrometer 100. $A_{SDFT}$ includes the spatial pattern produced by interference of the speckle pattern with the MZI outputs 116, as described herein. $A_{SDFT}$ was generated using Equations 8-10.

The lower right panel of FIG. 3B shows the same input spectrum, S, (shown with the dashed line) and the output spectrum, P, which was reconstructed by the SDFT spectrometer 100. The reconstructed output spectrum, P, was generated using the technique of Equations 2-4.

In the case of the SDFT spectrometer 100, the reconstructed output spectrum, P, is an accurate representation of the broadband input spectrum, S. This illustrates that the SDFT spectrometer 100 exhibits good optical performance for relatively course spectral features and that the SDFT spectrometer can reconstruct a broadband spectrum despite the presence of high-frequency intensity perturbations in the $A_{SDFT}$ calibration matrix due to the speckles.

FIG. 3C illustrates the simulated performance of DFT-only and speckle-only spectrometers in comparison to the SDFT spectrometer 100 for an input spectrum with fine spectral features. The upper left panel of FIG. 3C shows the simulated calibration matrix, $A_{MZI}$, for a DFT-only spectrometer, while the middle left panel shows the simulated calibration matrix, $A_{speckle}$, for a speckle-only spectrometer and the lower left panel shows the simulated calibration matrix, $A_{SDFT}$, for the SDFT spectrometer 100. These calibration matrices include the interference patterns generated by the respective spectrometers (DFT-only, speckle-only, and SDFT) and recorded by a row of 1400 pixels of the detector 130 for each of many input wavelengths over the relatively narrow bandwidth of 1530.0-1530.4 nm.

The right panels of FIG. 3C show the input spectrum, S, (shown with the dashed line) and the output spectrum, P, which was reconstructed by each respective spectrometer (DFT-only, speckle-only, and SDFT). In this case, the input spectrum, S, includes fine spectral features. The reconstructed output spectra, P, were generated using the technique of Equations 2-4.

In contrast to the case described in FIG. 3B, here the speckle-only spectrometer was able to reconstruct the high-resolution spectrum (as shown in the middle right panel), whereas the DFT-only spectrometer failed to do so (as shown in the top right panel). As shown in the bottom right panel of FIG. 3B, however, the SDFT spectrometer 100 was able to reconstruct the fine input spectrum, S, very well. This result demonstrates that the SDFT spectrometer 100 can resolve both broadband and high-resolution spectra that otherwise are not possible with either a DFT-only or speckle-only spectrometer alone.

In addition to simulating various embodiments of SDFT spectrometer 100, as discussed with respect to FIGS. 3A-3C, a physical embodiment of the SDFT spectrometer 100 was also built to experimentally characterize its performance. The physical example embodiment of the SDFT spectrometer 100 was a chip-scale device with a DFT spectrometer section 110 that included an array of 64 MZIs 114 with varying relative path-length difference fabricated on a SOI platform. The MZIs 114 were formed using 3 dB Y-splitters and 500 nm wide waveguides etched on 220 nm silicon layer. An input light was guided to the MZIs 114 using 64, 3 dB Y-splitters. The input and output of the waveguides were terminated at the end of the chip-facet using a polarization-independent, sub-wavelength grating mode-converter. The mode-converter used an inverse-tapered structure to couple the ~3 μm fiber mode field to the 500 nm waveguide structure. The DFT spectrometer section 110 was fabricated on top of a 675 μm thick silicon wafer which served as the MMW 122 for the speckle spectrometer section 120.

Figure 4A:
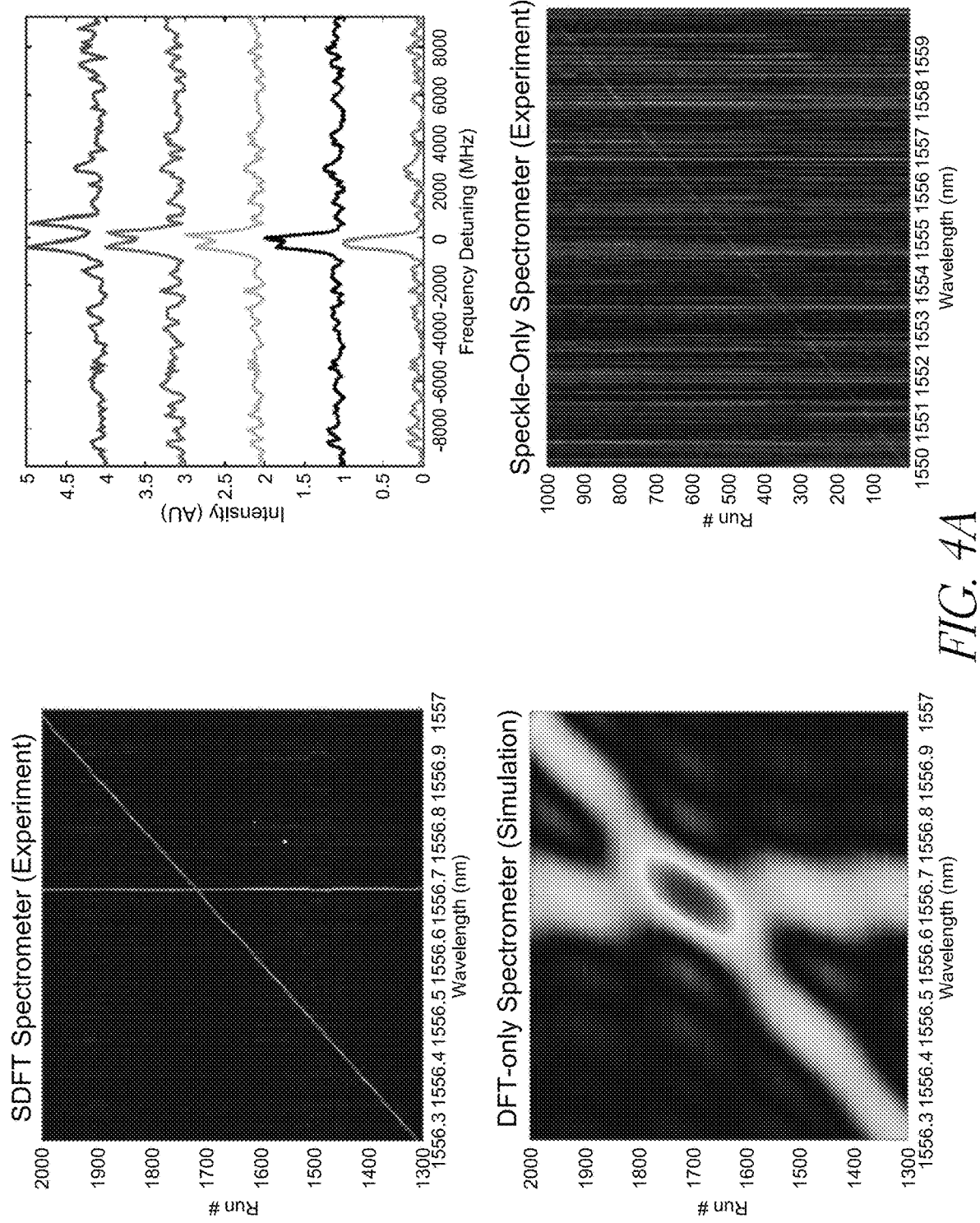
FIG. 4A illustrates the measured performance of an example physical embodiment of the SDFT spectrometer of FIG. 2A in comparison to the simulated performance of a DFT-only spectrometer and the measured performance of a speckle-only spectrometer.

FIG. 4A illustrates the measured performance of the example physical embodiment of the SDFT spectrometer 100 in comparison to the simulated performance of a DFT-only spectrometer and the measured performance of a speckle-only spectrometer. To generate the data in FIG. 4A, input light 102 was coupled to the chip through edge-coupling using a high-NA single-mode fiber. The fiber was slightly misaligned (by ~1 μm) such that the leaked light could propagate through the MMW 122 to develop a speckle pattern 126. The output detection areas 132 of the chip where imaged using a 4× microscope objective and a 2D pixel-array InGaAs camera has the detector 130. Several fine- and coarse-resolution calibration matrices, $A_{SDFT}$, were obtained by scanning a tunable, narrow-band laser with frequency step of 0.001 nm and recording intensity values from the output detection areas 132.

A two-tone test was performed to demonstrate that the SDFT spectrometer 100 was capable of reconstructing an unknown spectrum. In the test, two lasers were fed into the SDFT spectrometer 100 and a series of intensity patterns were recorded over time by fixing one laser at a constant wavelength and changing the relative detuning between the two lasers. The calibration matrix, $A_{SDFT}$, was used to reconstruct the input spectrum from each of the time series of recorded intensity patterns using Equation 2-4. The top left panel in FIG. 4A shows the time series of reconstructed spectra. It shows that the SDFT spectrometer 100 was able to reconstruct the two-tone spectrums with high precision. The upper right panel in FIG. 4A is a zoomed-in view of five of the reconstructed spectra in the time series. It shows that the SDFT spectrometer 100 was able to resolve the two spectral lines when they were separated by 370 MHz, far beyond the resolution limit (25 GHz) expected from a DFT-only spectrometer.

To compare the performance of the SDFT spectrometer 100 with a DFT-only spectrometer, the time series of reconstructed spectra was simulated for a DFT-only spectrometer using the design parameters of the SDFT spectrometer 100. The bottom left panel of FIG. 4A shows that, as expected, the DFT-only spectrometer had much poorer capability to resolve the spectral lines of the two lasers. Meanwhile, the bottom right panel of FIG. 4A shows a time series of the reconstructed spectra using a speckle-only spectrometer. The speckle-only data was recorded from output detection areas 132 well below the outputs 116 of the MZIs 114 where there was minimal overlap with the MZI outputs. Although the spectral lines of the two lasers are faintly visible in the speckle-only data, they are overwhelmed by noise in the form of many false spectral lines.

As can be seen in FIG. 4A, the SDFT spectrometer 100 was able to reconstruct the spectrum for a large bandwidth, whereas the speckle-only data reconstructed multiple false spectral lines, making it infeasible for reconstructing signal in a broad wavelength region. This is due to the limited unique speckle fingerprint as the input spectral window is increased. In order for the SDFT spectrometer 100 to provide a unique high-resolution fingerprint at a wide range of wavelengths, the resolution of the MZI can be on the scale of the speckle bandwidth. This results in the bandwidth of the SDFT spectrometer being $B \sim N/2 \times (N_m-1)\delta f$, where $\delta f$ is the resolution of the speckle-only spectrometer, $N_m$ is the total number of modes propagating in the MMW 122, and N is the number of MZIs.

Figure 4B:
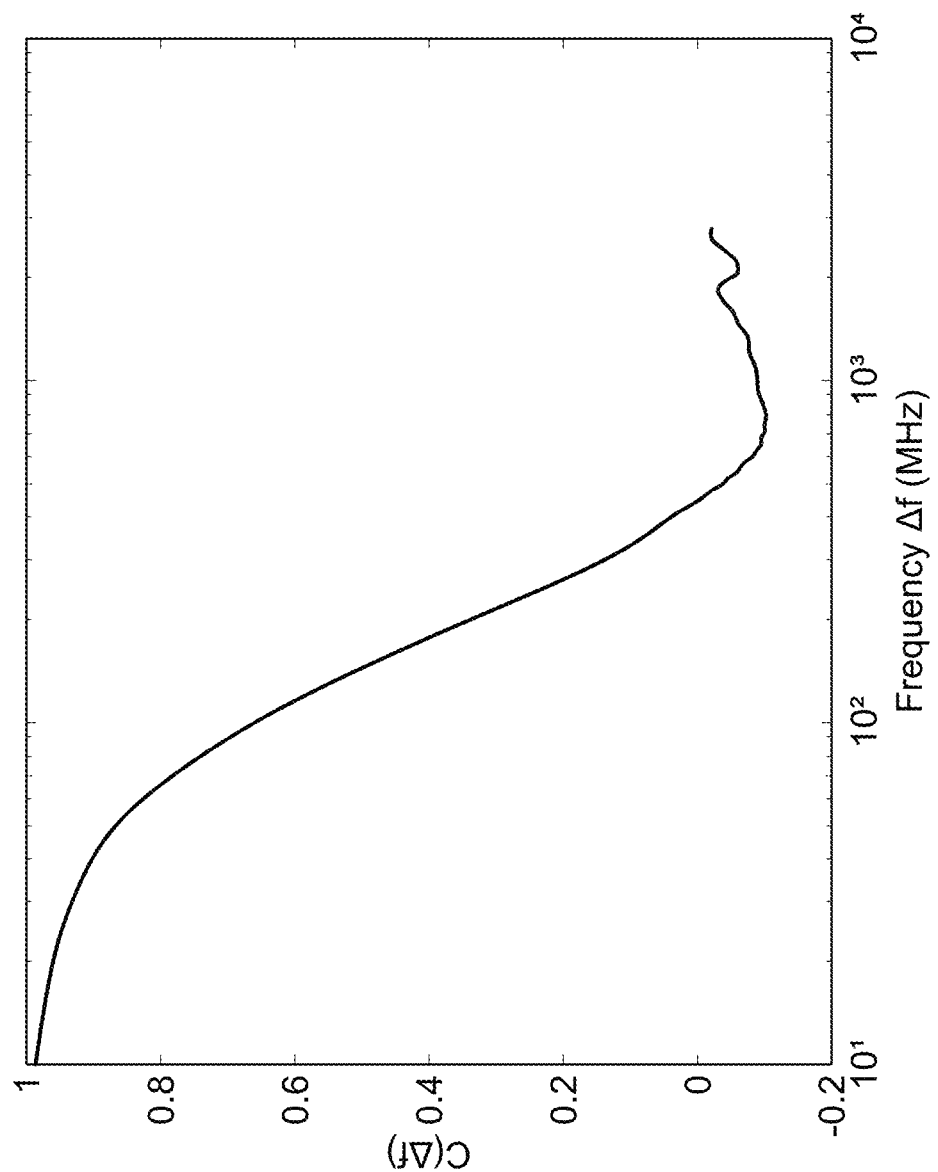
FIG. 4B is a graph of the measured high-resolution spectral correlation of the example physical embodiment of the SDFT spectrometer characterized by FIG. 4A.

The measurable resolution limit of the example physical embodiment of the SDFT spectrometer 100 was limited by the scan step size of the tunable laser. Thus, to determine the true-resolution limit of the example embodiment of the SDFT spectrometer 100, a high-resolution spectral scan was performed using a continuous-wave laser that was modulated to suppress the carrier frequency while the sideband frequencies were scanned in 50 MHz steps using a computer controlled RF-driver. A frequency-dependent calibration matrix was recorded. Since the resolution of the SDFT spectrometer 100 is set by the shift in frequency needed to decorrelate the speckle pattern, the frequency correlation of the device was calculated using the following equation, $$C(\Delta f, x) = \frac{\langle I(f, x)I(f+\Delta f, x)\rangle}{\langle I(f, x)\rangle\langle I(f+\Delta f, x)\rangle} - 1 \quad (11)$$

where $\langle I(f, x)\rangle$ is the intensity recorded by the camera at coordinate x for an input optical frequency off averaged over all frequency scans. The spectral resolution ($\delta f$) of the SDFT spectrometer 100 is determined by the correlation width at which the speckle correlation drops to half. FIG. 4B is a graph of the measured high-resolution spectral correlation of the SDFT spectrometer 100 with (0) normalized to be 1. From the data, the correlation frequency of the SDFT spectrometer 100 is found to be 140 MHz, ~160 times better than the traditional DFT spectrometer.

The example physical embodiment of the SDFT spectrometer 100 had 140 MHz resolution with ~10 nm bandwidth, where the both high-resolution and large-bandwidth spectrum could be measured and reconstructed based on a single measurement image. A speckle-only spectrometer would have required a 100 m long multimode fiber to achieve sub-GHz resolution, as achieved by the SDFT spectrometer 100. Although the footprint of the example embodiment of the SDFT spectrometer 100 was not optimized, it nevertheless was fabricated on an optical chip with a mere 1.66 mm×5.74 mm footprint. Using high refractive index contrast and small waveguide size (e.g., 500 nm), a large number of MZIs 114 can be densely packed into a mm² chip. The example physical embodiment of the SDFT spectrometer could be extended in the same platform to have, for example, ~100 nm bandwidth centered at ~1500 nm by fabricating N=128 MZIs with $\Delta L_{min}$=1.9 μm. The spectral resolution could be further enhanced, and/or the device footprint be reduced, by adding scattering features to the MMW 122, as described herein.

Figure 5A:
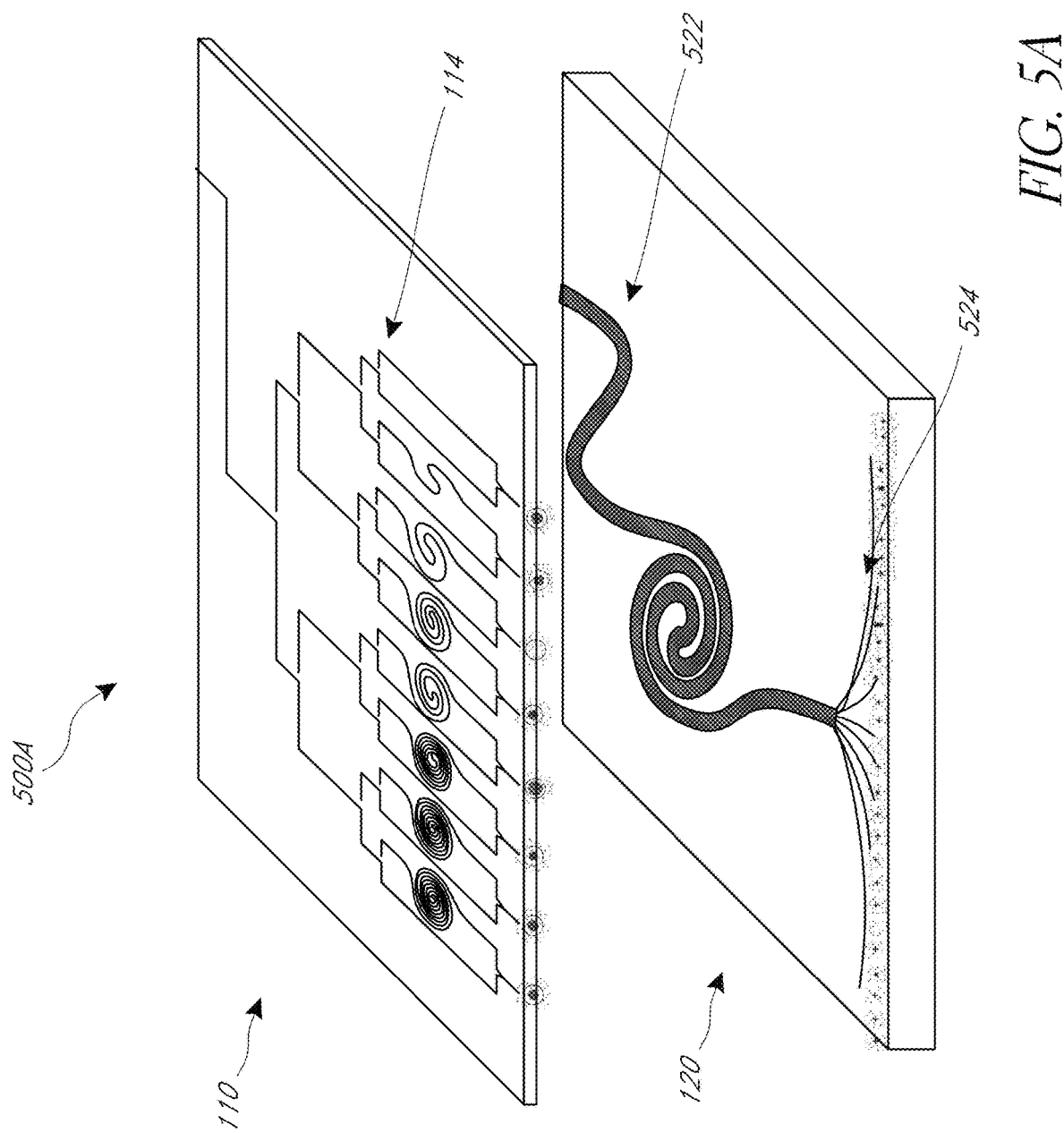
FIGS. 5A-5C are exploded views of other example embodiments of the SDFT spectrometer shown in FIG. 1A.
Figure 5B:
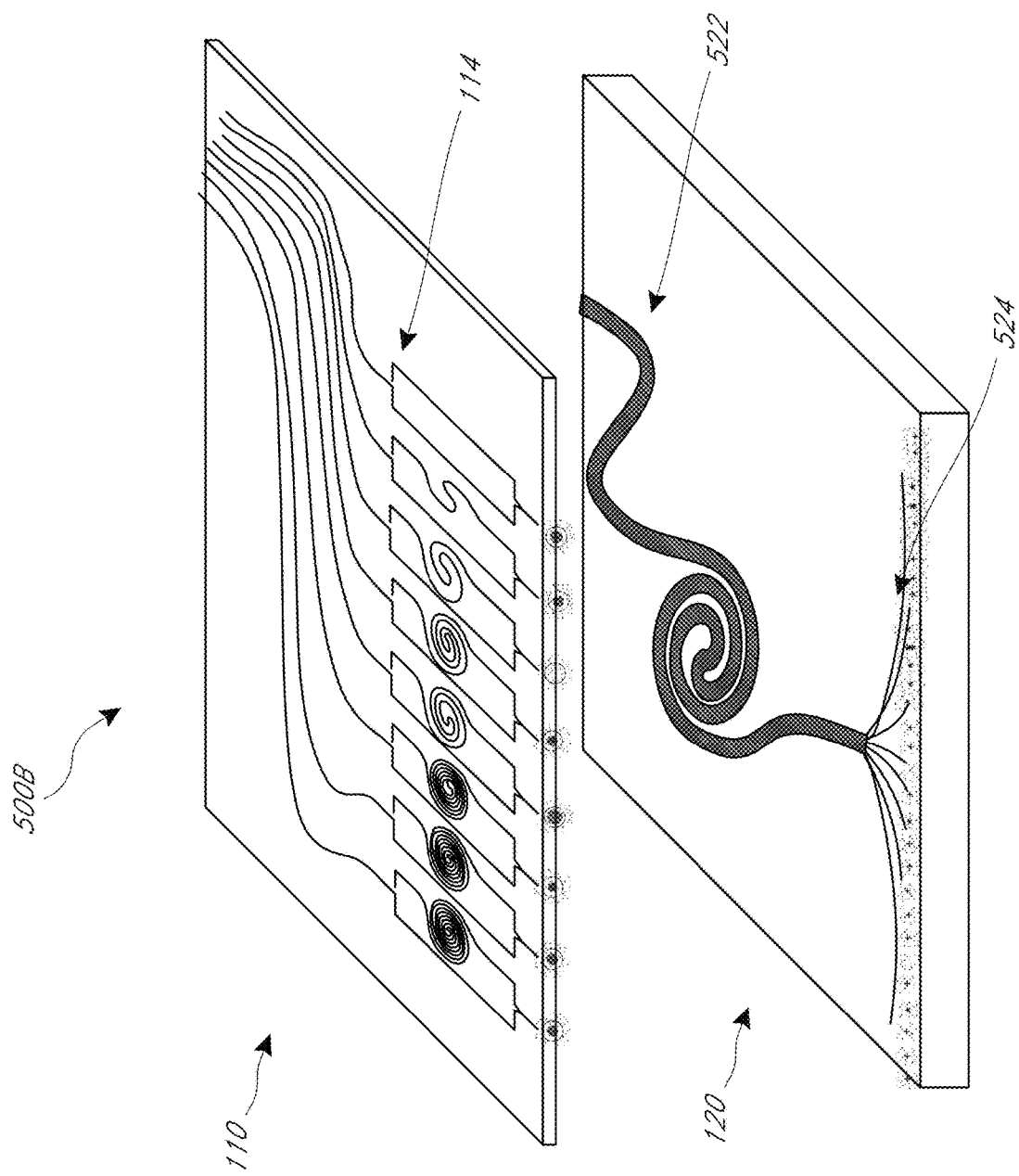
Figure 5C:
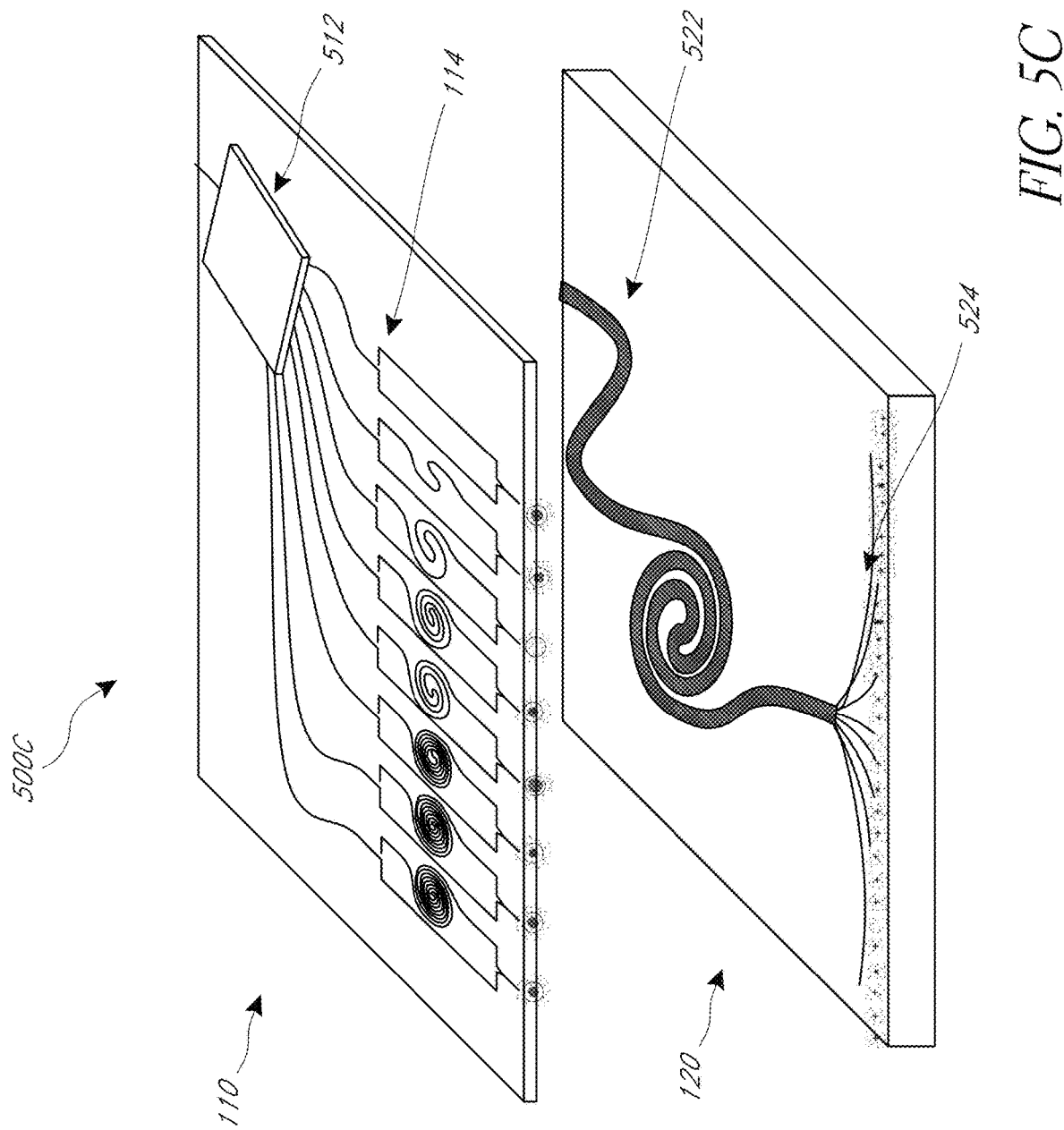

FIGS. 5A-5C are exploded views of other example embodiments (500A, 500B, 500C, respectively) of the SDFT spectrometer 100 shown in FIG. 1A. The SDFT spectrometer embodiments 500A-C shown in FIGS. 5A-5C, respectively, all include a DFT spectrometer section 110 and a speckle spectrometer section 120. In these embodiments, however, the speckle spectrometer section 120 includes an MMW 522 that is formed in a folded configuration. This allows the MMW 522 to have a greater propagation length within a given space. This in turn can help to improve mixing between the various propagation modes, thus enhancing the resolution of the speckle spectrometer section 120, as discussed herein. The folded MMW 522 in the SDFT spectrometer embodiments 500A-C shown in FIGS. 5A-5C is an terminate in a plurality of smaller waveguides 724 (e.g., single-mode waveguides) which are spatially distributed to span the outputs from the DFT spectrometer section 110.

FIGS. 5A-5C illustrate different types of inputs for the DFT spectrometer section 110. In FIG. 5A, the DFT spectrometer section 110 includes a single input for the input light 102 and N splitters which distribute the input light amongst the N interferometers 114, as shown in FIG. 2A. In FIG. 5B, the DFT spectrometer section 110 includes N parallelized inputs—one for each of the N interferometers 114. Finally, in FIG. 5C, the DFT spectrometer section 110 includes a single input for the input light 102 and a single 1×N splitter 512 which distributes the input light amongst the N interferometers 114.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, etc. described herein. A wide variety of variation is possible. Components, elements, and/or steps can be altered, added, removed, or rearranged. While certain embodiments have been explicitly described, other embodiments will become apparent to those of ordinary skill in the art based on this disclosure.

Depending on the embodiment, certain acts, events, or functions of any of the methods described herein can be performed in a different sequence, can be added, merged, or left out altogether (e.g., not all described acts or events are necessary for the practice of the method). Moreover, in certain embodiments, acts or events can be performed concurrently or sequentially.

The processing, or processor, disclosed herein can be implemented using, for example, electronic hardware, computer software, or combinations of both. Whether such functionality is implemented as hardware or software depends upon the particular application and design constraints imposed on the overall system. The described functionality can be implemented in varying ways for each particular application. In the case of software, a software module can reside in RAM memory, flash memory, ROM memory, EPROM memory, EEPROM memory, registers, a hard disk, a removable disk, a CD-ROM, or any other form of computer-readable storage medium known in the art. A storage medium can be coupled to a processor such that the processor can read information from, and write information to, the storage medium. In the case of hardware, the processor can be implemented as a single processor computer chip, multiple computer chips, an ASIC, an FPGA, discrete components, or any other suitable processing device or equipment. In addition, the processor may be directly or remotely communicatively coupled (e.g., via a network such as the Internet or a LAN) to the information source. The processor may also include a distributed computing cluster or grid.

While the above detailed description has shown and described features of various embodiments, it will be understood that various omissions, substitutions, and changes in the form and details of the devices or algorithms illustrated can be made without departing from the overall scope of the invention. As will be recognized, certain embodiments of the invention described herein can be embodied within a form that does not provide all of the features and benefits set forth herein, as some features can be used or practiced separately from others. The scope of the invention disclosed herein is indicated by the appended claims rather than by the foregoing description.

What is claimed is:

1. A spectrometer comprising:
a plurality of interferometers configured to produce a first spatially-distributed pattern of light corresponding to one or more spectral characteristics of an input light signal;
a multi-mode waveguide configured to produce a second spatially-distributed pattern of light corresponding to the one or more spectral characteristics of the input signal;
an interference region in optical communication with both the multi-mode waveguide and the plurality of interferometers such that the second spatially-distributed pattern of light interferes with the first spatially-distributed pattern of light in the interference region; and
a detector positioned to detect a plurality of intensity values of light from the interference region.

2. The spectrometer of claim 1, wherein the spectrometer has a measurement resolution that is finer than a measurement resolution associated with the plurality of interferometers alone.

3. The spectrometer of claim 1, wherein the spectrometer has a measurement bandwidth that is larger than a measurement bandwidth associated with the multi-mode waveguide alone.

4. The spectrometer of claim 1, wherein the spectrometer has finesse of at least $10^4$.

5. The spectrometer of claim 1, wherein the plurality of interferometers are Mach-Zehnder interferometers with a corresponding plurality of relative optical path length differences.

6. The spectrometer of claim 1, wherein the plurality of interferometers are integrated optical devices formed on an optical chip.

7. The spectrometer of claim 6, wherein the optical chip comprises a substrate that physically supports the plurality of interferometers.

8. The spectrometer of claim 7, wherein the substrate comprises the multi-mode waveguide.

9. The spectrometer of claim 1, wherein the second spatially-distributed pattern of light comprises a wavelength-dependent speckle pattern.

10. The spectrometer of claim 1, wherein the multi-mode waveguide supports at least ten propagation modes.

11. The spectrometer of claim 1, wherein the multi-mode waveguide comprises a plurality of scattering features.

12. The spectrometer of claim 11, wherein the plurality of scattering features are located on a surface of the multi-mode waveguide so as to form a roughened surface.

13. The spectrometer of claim 11, wherein the scattering features have dimensions in a range of 0.2-5.0 times an operating wavelength of the spectrometer.

14. The spectrometer of claim 1, further comprising a buffer layer between the plurality of interferometers and the multi-mode waveguide, the buffer layer having a lower refractive index than those of the plurality of interferometers and the multi-mode waveguide.

15. The spectrometer of claim 1, further comprising one or more reflective surfaces in proximity to one or more surfaces of the multi-mode waveguide.

16. The spectrometer of claim 1, further comprising a processor configured to calculate a reconstructed spectrum for the input light signal based on the plurality of intensity values detected by the detector.

17. The spectrometer of claim 16, further comprising a non-transitory memory communicatively coupled to the processor, the non-transitory memory storing intensity values detected by the detector from the interference region in response to a plurality of input light signals with known spectra.

18. The spectrometer of claim 1, further comprising an optical fiber or focusing element to provide the input light signal to the spectrometer, wherein the optical fiber or focusing element is misaligned from an input port for the plurality of interferometers to allow a portion of the input light signal to leak into the multi-mode waveguide.

19. The spectrometer of claim 1, wherein the bandwidth of the multi-mode waveguide is greater than or equal to the resolution of the plurality of interferometers.

20. The spectrometer of claim 1, wherein the resolution of the plurality of interferometers is up to 20 times greater than the bandwidth of the multi-mode waveguide.

* * * * *